(12) United States Patent
Tortorella, Jr.

(10) Patent No.: US 12,030,438 B2
(45) Date of Patent: Jul. 9, 2024

(54) LICENSE PLATE HOLDER

(71) Applicant: Frank Joseph Tortorella, Jr., Park Ridge, IL (US)

(72) Inventor: Frank Joseph Tortorella, Jr., Park Ridge, IL (US)

( * ) Notice: Subject to any disclaimer, the term of this patent is extended or adjusted under 35 U.S.C. 154(b) by 254 days.

(21) Appl. No.: 17/630,945

(22) PCT Filed: Jul. 23, 2020

(86) PCT No.: PCT/US2020/043185
§ 371 (c)(1),
(2) Date: Jan. 28, 2022

(87) PCT Pub. No.: WO2021/021540
PCT Pub. Date: Feb. 4, 2021

(65) Prior Publication Data
US 2022/0274540 A1    Sep. 1, 2022

Related U.S. Application Data

(60) Provisional application No. 62/880,056, filed on Jul. 29, 2019.

(51) Int. Cl.
*B60R 13/10* (2006.01)
*G09F 9/30* (2006.01)
(Continued)

(52) U.S. Cl.
CPC .............. *B60R 13/105* (2013.01); *G09F 9/30* (2013.01); *G09F 2007/1895* (2013.01); *G09F 21/00* (2013.01)

(58) Field of Classification Search
CPC ... G09F 7/18; G09F 9/30; G09F 13/18; G09F 2007/1895; G09F 21/04
See application file for complete search history.

(56) References Cited

U.S. PATENT DOCUMENTS 1,699,191 A    1/1929  Holmes
1,975,796 A    8/1933  Miller et al.
(Continued)

FOREIGN PATENT DOCUMENTS

DE    3821762 A1    1/1990
JP    0976845 A     3/1997

OTHER PUBLICATIONS

PCT International Search Report for PCT/US2020/043185, Issued Oct. 1, 2020.

*Primary Examiner* — Cassandra Davis

(57) ABSTRACT

A license plate holder includes a base (1200) including a first connector (1205) for attaching the base (1200) to a vehicle, a transmissive substrate (1120) an a frame (1140) defining a central opening (1142) to permit display of indicia on at least one license plate display region (1162) of a license plate (1160) disposed between the base and the frame, the frame (1140) including at least one first rear connector (1600) disposed at a rear or peripheral portion of the frame to removably engage a corresponding at least one second rear connector (1500) disposed on the base (1200). The transmissive substrate (1120) and/or the frame (1140) further defines at least one display region (1146) adjacent the central opening (1142) of the frame (1140) and outside of the at least one license plate display region (1162). The transmissive substrate (1120) is attached to, or is removably attachable to, a front of the frame (1140) to at least substantially cover the front of the frame (1140).

13 Claims, 24 Drawing Sheets

(51) Int. Cl.
G09F 7/18 (2006.01)
G09F 21/00 (2006.01)

(56) References Cited

U.S. PATENT DOCUMENTS

| | | |
|---|---|---|
| 2,689,948 A | 10/1950 | Rothman |
| 2,710,475 A | 9/1954 | Salzmann |
| 3,432,954 A | 3/1969 | Ford |
| 3,685,188 A | 8/1972 | Syversen |
| 4,819,355 A | 4/1989 | Solo |
| 4,891,895 A | 1/1990 | Delaquil |
| 4,924,611 A | 5/1990 | Shaw |
| 5,012,602 A | 5/1991 | Storey |
| 5,073,842 A | 12/1991 | Monroe |
| 5,638,623 A | 6/1997 | Shuen |
| 6,167,645 B1 | 1/2001 | Gasko et al. |
| 6,385,876 B1 | 5/2002 | McKenzie |
| 6,478,458 B2 | 12/2002 | Hickman |
| 6,892,483 B2 | 5/2005 | Parenti |
| 7,415,787 B2 * | 8/2008 | Eidsmore ............ B60R 13/105 40/201 |
| 7,836,618 B1 | 11/2010 | Parenti |
| 7,877,908 B2 * | 2/2011 | Collins ............... B60R 13/105 40/643 |
| 9,637,069 B2 | 5/2017 | Eiland |
| 10,017,132 B1 | 7/2018 | Griffey |
| 2002/0092216 A1 | 7/2002 | Rice |
| 2008/0098629 A1 | 5/2008 | Graham |
| 2008/0230651 A1 | 9/2008 | Porte |
| 2009/0077843 A1 | 3/2009 | Dayan et al. |
| 2017/0064218 A1 | 3/2017 | Ballatan |
| 2017/0129422 A1 * | 5/2017 | Gloodt .................... B60Q 1/56 |

* cited by examiner

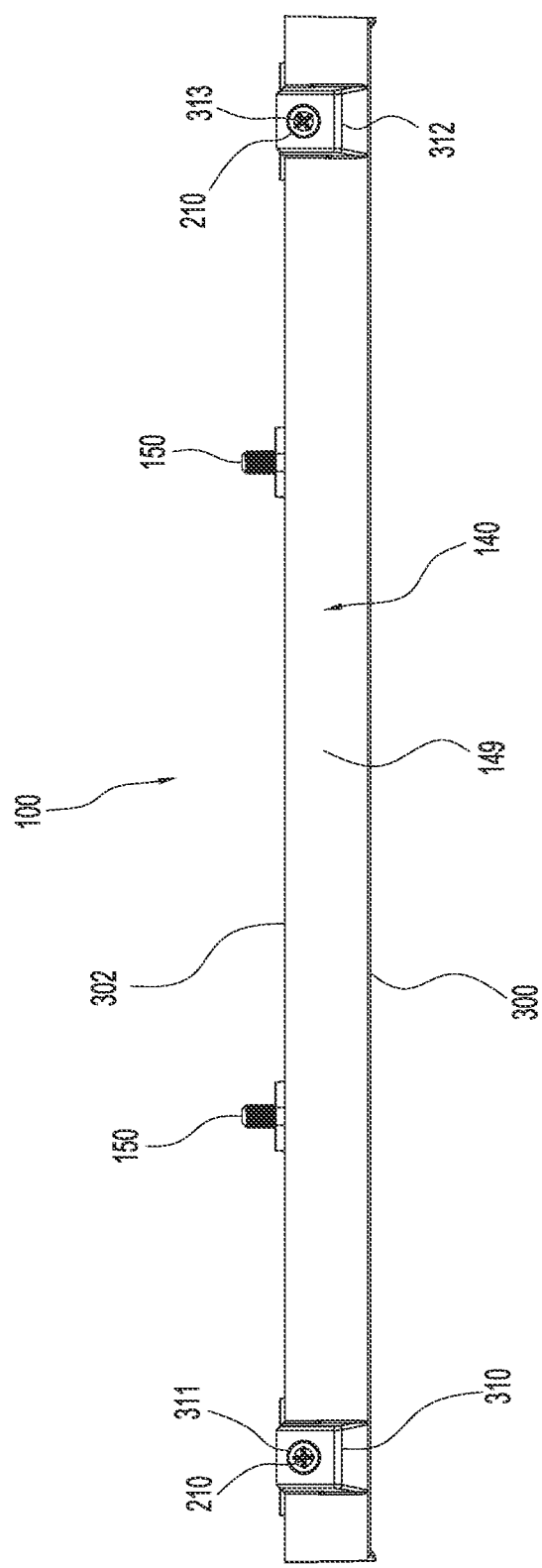

LICENSE PLATE HOLDER

This application claims priority to, and is a national phase application under 35 USC 371, PCT Appl. Ser. No. PCT/US2020/043185, filed on Jul. 23, 2020, and further claims priority to U.S. Provisional Patent Application Ser. No. 62/880,056, filed on Jul. 29, 2019, the contents of each of which are incorporated herein by reference in their entirety.

BACKGROUND

A vehicle registration plate, also known as a number plate (British) or a license plate (American), is a metal or plastic plate attached to a motor vehicle or trailer for official identification purposes. All countries require registration plates for road vehicles such as cars, trucks, and motorcycles. The registration identifier is a numeric or alphanumeric ID that uniquely identifies the vehicle owner within the issuing region's vehicle register. In various examples, license plates may be 305 mm×152 mm (12.0"×6.0")(the United States), 520 mm×110 mm (20.5"×4.3") (various European countries), or 440 mm×140 mm (17.3"×5.5") (China). License plates may be formed from a variety of materials, such as plastic or metal (e.g., aluminum, steel, an alloy, etc.).

To secure the license plate to the vehicle, a license plate holder or license plate frame is used to hold the license plate and is itself attached to the vehicle, typically by screws that mount into threaded fittings on the vehicle. The license plate holder is configured to ensure that the license plate numbers and regulatory stickers are not obscured. License plate holders are often made from a metal (e.g., stainless steel, aluminum, etc.) or plastic, and may have a protective coating applied thereover.

BRIEF DESCRIPTION OF THE DRAWINGS

FIG. 3 is an example bottom view of the example license plate holder of FIGS. 1-2B in an assembled state.

Figure 1:
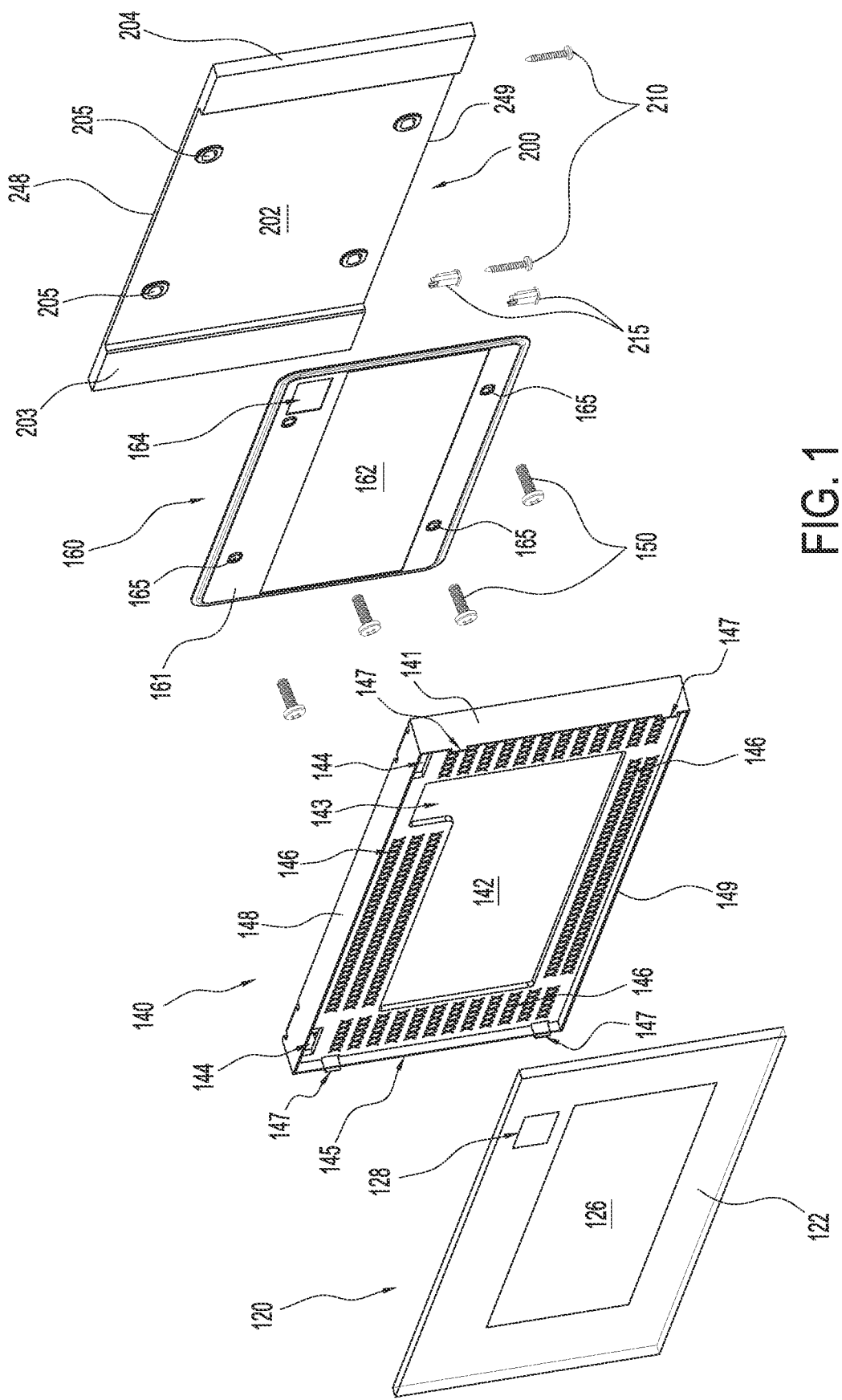
FIG. 1 is an exploded perspective view of an example license plate holder in accord with at least some of the present concepts.

The figures are not necessarily to scale. Wherever possible, the same reference numbers, or similar reference numbers, are used throughout the drawing(s) and accompanying written description to refer to the same or like parts. As used herein, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

In some aspects, this disclosure relates to an example license plate holder for vehicles, inclusive of road vehicles (e.g., cars, trucks, motorcycles, scooters, etc.), off-road vehicles (e.g., 3-wheelers, all-terrain vehicles, four wheelers, etc.), and marine vehicles (e.g., boats), which require registration with a governmental body and display of a license plate on the vehicle.

FIG. 1 is an exploded perspective view of an example license plate holder 100 in accord with at least some of the present concepts. The example license plate holder 100 is shown to include, from left-to-right, an example transmissive substrate 120, an example frame 140 and an example base 200. An optional example license plate 160 is also shown in relation to the example license plate holder 100 for contextual illustration to show an example integration of a license plate 160 with a license plate holder 100 in accord with at least some aspects of the present concepts.

The example transmissive substrate 120 may include, for instance, but is not limited to, a substrate of glass, treated or strengthened glass (e.g., Gorilla Glass (Corning), Dragontrail (AGC Inc.), Xensation (Schott AG)), Plexiglass (e.g., Lucite, Acrylite, Perspex, Oroglass Optix, Altuglass, etc.), polycarbonate, acrylic (e.g., injection molded acrylic or polymethyl methacrylate, polystyrene or poly(methyl methacrylate)(PMMA). In some examples, the example transmissive substrate 120 is a uniform substrate of a selected material. In some examples, the example transmissive substrate 120 includes a plurality of different regions such as an example first region 126 (e.g., a central region) having a first set of characteristics (e.g., optical properties such as refractive index, transmission/transmittance, absorption, graphics, mechanical properties such as Young's modulus, surface finish, strength, hardness, impact resistance, chemical resistance, etc.), an example second region 122 (e.g., a peripheral region) having a second set of characteristics, and an example third region 128 having a third set of characteristics. In some examples, two regions may have the same characteristics (e.g., the example first region 126 and the example third region 128). In the example transmissive substrate 120 shown in FIG. 1, the example first region 126 generally corresponds in size to a display area (e.g., a DIN 1451 license plate number) of an example license plate (e.g., example license plate 160) to be incorporated into the example license plate holder 100 (e.g., a United States license plate, a European license plate, a Chinese license plate, etc.). For instance, in some examples, the example first region 126 is less than 12.0"×6.0" (305 mm×152 mm) for a United States license plate, less than 20.5"×4.3" (520 mm×110 mm) for a license plate of some European countries, or 17.3"×5.5" (440 mm×140 mm) for a Chinese license plate. In some examples, the example first region 126 is a cutout in the example transmissive substrate 120.

In some examples, the example transmissive substrate 120 comprises a substrate of glass that is about 0.12 inches thick. In other examples, the example transmissive substrate 120 comprises a substrate of glass that is less than 0.12 inches thick or greater than 0.12 inches thick, such as between 0.12-0.25 inches thick.

In some examples, the third example third region 128 is optionally omitted. In some examples, the example transmissive substrate 120 includes the third example third region 128, as may be required in jurisdictions requiring the display of an additional emblem or sticker (e.g., a governmental vehicle registration sticker, etc.). The example third region 128 may alternatively be sized differently (e.g., larger, smaller, etc.) and/or disposed in another location on the example transmissive substrate 120 to comport with sizing and/or location requirements of any particular jurisdiction. For instance, the example third region 128 may be disposed in a location other than shown in the example of FIG. 1, such as in an upper left portion of the example transmissive substrate 120 or in an upper center portion of the example transmissive substrate 120. In some examples, the example third region 128 is a cutout in the example transmissive substrate 120. In some examples, two example third regions 128 may be provided, such as to permit the display of two emblems or stickers.

The example frame 140 defines an example central opening 142 to permit display of indicia, such as the license plate number, on an example first license plate display region 162. In some examples, such as is shown in FIG. 1, the example central opening 142 opens into, or is contiguous to, an example secondary opening 143 adjacent the example central opening 142. In some examples, the example central opening 142 is a distinct opening separate from that of the example secondary opening 143. As noted above, in some examples, the third example third region 128 is optionally omitted where there are no jurisdictional requirements for the display of an additional emblem or sticker (e.g., a governmental vehicle registration sticker, etc.), at an example second license plate display region 164, in an offset position from the example first license plate display region 162. In such examples, the secondary opening 143 may likewise be omitted. In other examples, the example secondary opening 143 may alternatively be sized differently (e.g., larger, smaller, etc.) and/or disposed in another location on the example frame 140 to comport with sizing and/or location requirements of any particular jurisdiction. For instance, the example secondary opening 143 may be disposed in a location other than shown in the example of FIG. 1, such as in an upper left portion of the example frame 140 or in an upper center portion of the example frame 140.

In some examples, the example central opening 142 is less than about 305 mm×152 mm (12.0"×6.0") and is sized so as not to obscure a first license plate display region 162 (e.g., a license plate number) for a United States vehicle license plate. In some examples, the example central opening 142 is less than about 520 mm×110 mm (20.5"×4.3") and is sized so as not to obscure a first license plate display region 162 (e.g., a license plate number) for a vehicle license plate in some European countries. Likewise, in other examples, the example central opening 142 is less than about 305 mm×152 mm (12.0"×6.0"), 305 mm×160 mm (12.0"×6.3"), 372 mm×135 mm (14.6" 5.3"), 440 mm×120 mm (17.3"×4.7"), 300 mm×80 mm (11.8"×3.1"), or 440 mm×140 mm (17.3"× 5.5").

The example frame 140 further defines one or more example frame display regions 146 adjacent the example central opening 142. In the example of FIG. 1, the example frame 140 is shown to define a plurality of frame display regions 146, more particularly, four example frame display regions 146. The example frame 140 of FIG. 1 includes an example bottom frame display region 146 below an example bottom edge of the central opening 142, an example first lateral frame display region 146 adjacent an example first lateral edge of central opening 142, an example second lateral frame display region 146 adjacent an example second lateral edge of central opening 142, or an example upper frame display region 146 above an example top edge of the central opening 142. The one or more example frame display regions 146 include text and/or graphics, which are generically represented in FIG. 1 by fields or arrays of "X" indicia. In some examples, one or more of the example frame display region(s) 146 include(s) user-selectable text or graphics (e.g., selected from a list of options provided on a website, custom printed, etc.), such as may be associated with sports team logos, organizations, colleges or universities, companies, phrases, causes, etc.

The example frame 140 of FIG. 1 defines a plurality of contiguous walls including an example first wall 141, an example second wall 145, an example third wall 148 and an example fourth wall 149. The example walls 141, 145, 148, 149 extend forwardly to define a first volume (not numbered) at the front of the example frame 140 to receive the example transmissive substrate 120. The example walls 141, 145, 148, 149 also extend rearwardly to define a second volume (not numbered) at the rear of the example frame 140 to receive the example license plate 160 and at least a portion of the example base 200. In some examples, the example walls 141, 145, 148, 149 extend both forwardly and rearwardly. In some examples, a first set of walls extends forwardly and a second set of walls extends rearwardly.

While a plurality of example walls 141, 145, 148, 149 are shown in the example frame 140 of FIG. 1, a lesser number of walls could be provided and/or the configuration of the walls altered. For instance, while not a presently preferred example, the example walls 141, 145, 148, 149 could extend rearwardly, but not forwardly. Instead of the example transmissive substrate 120 being received within the first volume defined by the example walls 141, 145, 148, 149, the example transmissive substrate 120 could instead positively connect to the example frame 140 via a plurality of male (or female) connectors (e.g., snap fit connectors, etc.) formed on the example transmissive substrate 120 to matingly engage with correspondingly configured and positioned female (or male) connectors formed on the example frame 140. In another example, the example transmissive substrate 120 is connected to the example frame 140 via a plurality of mechanical fasteners (e.g., screws, etc.).

In yet another example, the frame 140 could include a subset of the walls of FIG. 1, such as only wall 149 or only wall 148. In such example, the example transmissive substrate 120 could positively connect to the example frame 140 via a plurality of male (or female) connectors (e.g., snap fit connectors, etc.) formed on the example transmissive substrate 120 to matingly engage with correspondingly configured and positioned female (or male) connectors formed on the example frame 140 or, could positively connect to the example frame 140 via a plurality of mechanical fasteners (e.g., screws, etc.).

The example frame 140 includes one or more front connector(s) to removably attach the example transmissive substrate 120 to the front of the example frame 140. It the example of FIG. 1, the example frame 140 includes four example front connectors 147 disposed adjacent a front of the example frame 140. The four example front connectors 147 are cantilevered snap-fit connectors, having a head that is chamfered or tapered at a top surface, to facilitate biasing of the heads away from the first volume upon movement of the example transmissive substrate 120 into the first volume, wherein lateral edges of the example transmissive substrate 120 contact the chamfered or tapered top surfaces of the heads of the example front connectors 147 and slightly bias the heads outwardly. Following passage of the example transmissive substrate 120 into the first volume and past a bottom surface of the head, where it no longer outwardly biases the heads of the example front connectors 147, the heads returns to their initial positions and lower surfaces of the heads facilitate retention of the example transmissive substrate 120 within the first volume. For instance, in some examples, the lower surfaces of the heads of the example front connectors 147 are at flat and are at least substantially parallel to the front surface of the example transmissive substrate 120 such that the heads would have to be manually or digitally biased outwardly to facilitate removal of the example transmissive substrate 120. While four example front connectors 147 are shown, a greater number (e.g., five, six, etc.) or a lesser number (e.g., one, two, three) could alternatively be implemented in the example frame 140. Likewise, different forms of example front connectors 147 (e.g., male/female connectors, mechanical connectors, fasteners, etc.) may be implemented to facilitate removable attachment of the example transmissive substrate 120 to the example frame 140.

In some examples, the example frame 140 includes example openings 144. In some examples of the present concepts, the example openings 144 are omitted.

FIG. 1 also shows an example license plate 160, which may be formed from a variety of materials, such as plastic or metal (e.g., aluminum, steel, an alloy, etc.) or, in some instances, from card stock (e.g., a temporary tag). The example license plate 160 includes an example first license plate display region 162 for display of a license plate number and additional relevant information (e.g., a state of issuance, a state motto, etc.) and an example second license plate display region 164 for display of an emblem or a sticker (e.g., a governmental vehicle registration sticker, etc.) that may be required in a given jurisdiction. In some examples, a third license plate display region (not shown) may be required, similar to that of the example second license plate display region 164, in jurisdictions requiring a second emblem or a sticker. The example license plate 160 includes a plurality of example through holes 165 to receive example mechanical fasteners 150 (e.g., screws, etc.) to secure the example license plate 160 to the example base 200 and/or to the vehicle itself which bears the example license plate holder 100.

As discussed further in relation to FIGS. 2-7B below, the example frame 140 includes one or more rear connectors (not shown in FIG. 1) disposed adjacent a rear of the example frame 140 to removably attach the rear of the example frame 140 to the example base 200.

As noted above, the example license plate 160 may include any dimension specified by any jurisdiction including, but not limited to, for example, 305 mm×152 mm (12.0"×6.0"), 520 mm×110 mm (20.5"×4.3"), or 440 mm×140 mm (17.3"×5.5") to name but a few examples.

The example base 200 of FIG. 1 includes an example central section 202, an example first lateral section 203, and an example second lateral section 204. Formed within the example central section 202 are one or more example first connectors 205 (e.g., through holes, bosses, male connectors, female connectors, etc.) for attaching the example base 200 to a vehicle. The example central section 202 is recessed relative to the example first lateral section 203 and the example second lateral section 204 to define a recessed volume within which the example license plate 160 may be received. The recessed volume of the example central section 202 has an area sufficient to receive an example license plate 160 of a jurisdiction of relevance (e.g., greater than about 305 mm×152 mm (12.0"×6.0") in the United States, greater than about 440 mm×140 mm (17.3"×5.5") in China, etc.). In some examples, the example central section 202, the example first lateral section 203, and the example second lateral section 204 are substantially planar and the example first lateral section 203 and the example second lateral section 204 do not define a recessed volume therebetween.

Figure 5:
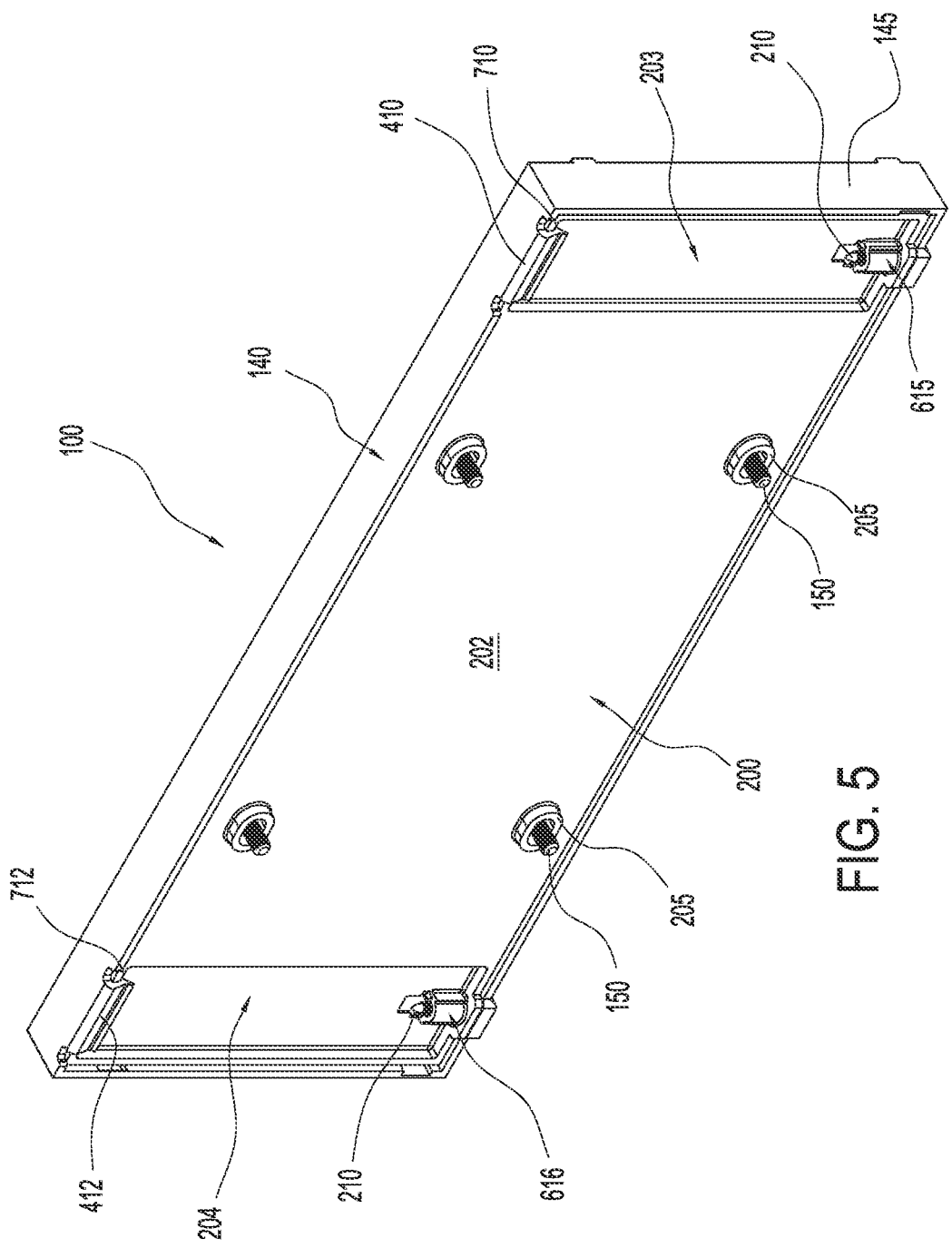
FIG. 5 is an example rear perspective view of the example license plate holder of FIGS. 1-4 in an assembled state.
Figure 6:
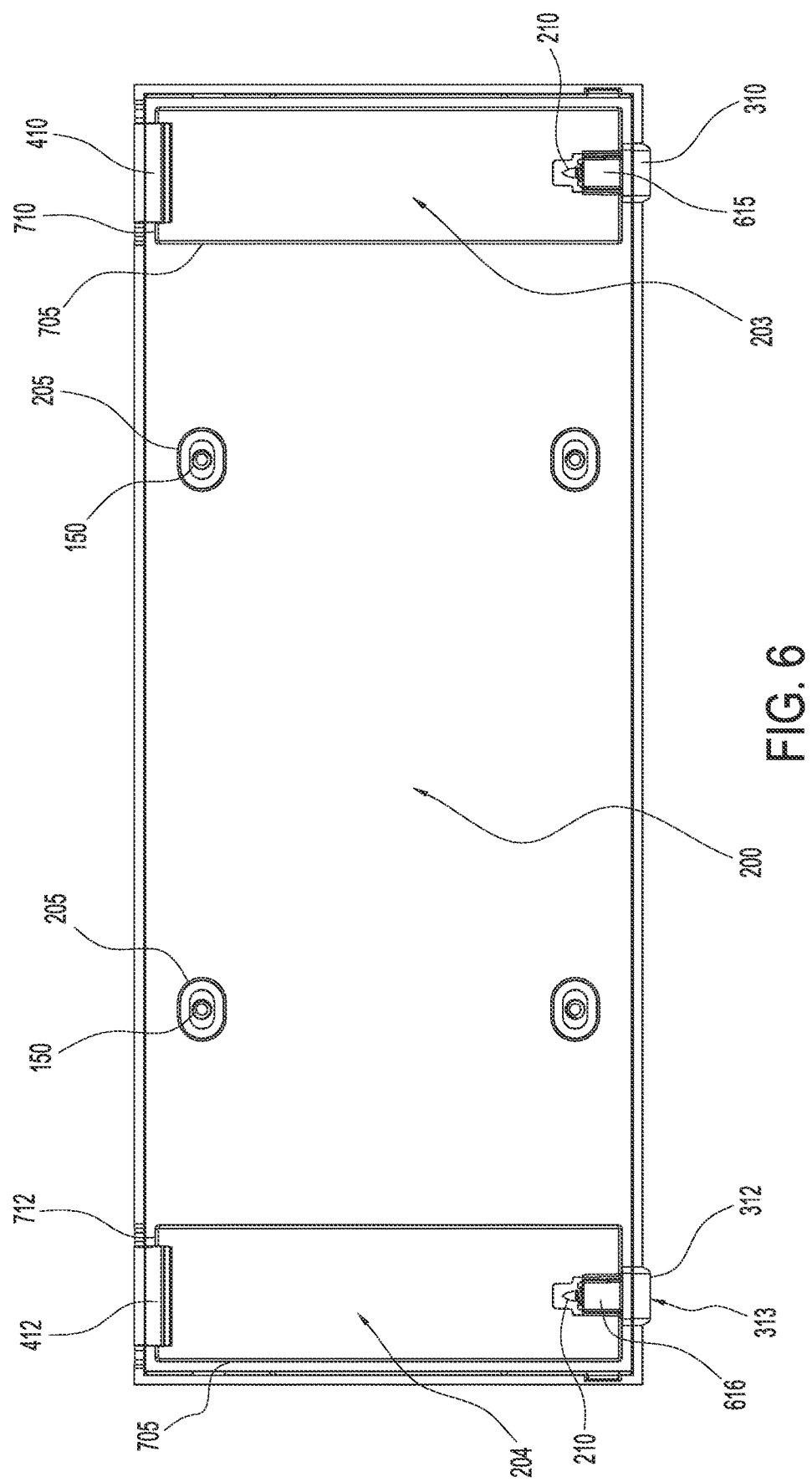
FIG. 6 is an example rear view of the example license plate holder of FIGS. 1-5 in an assembled state.

The exploded view of FIG. 1 shows, beneath the example base 200, example rear connectors 210 (e.g., mechanical fasteners, etc.) and example adapters 215 (e.g., anchors, anti-rotation anchors, etc.). The example rear connectors 210, discussed further below in relation to FIGS. 3 and 5-6, are inserted through corresponding openings in the example frame 140 and the example base 200 to secure a lower portion of the example frame 140 to a lower portion of the example base 200. In some examples, the example adapters 215 are inserted only into the example base 200. In some examples, the example adapters 215 are inserted through the example frame 140 and into the example base 200. In some examples, the example adapters 215 are omitted.

Figure 2A:
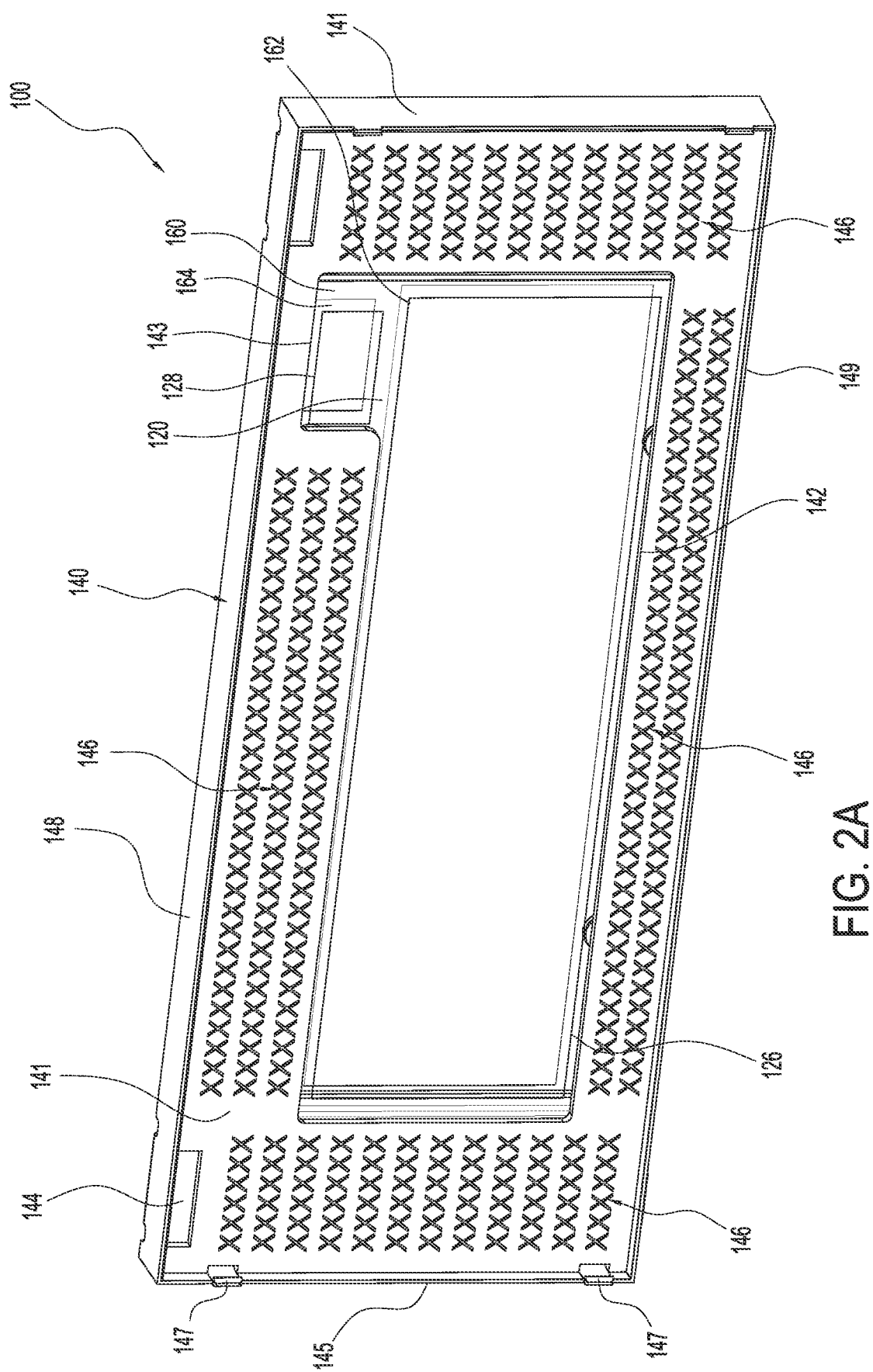
FIG. 2A is a perspective view of the example license plate holder of FIG. 1 in an assembled state.
Figure 2B:
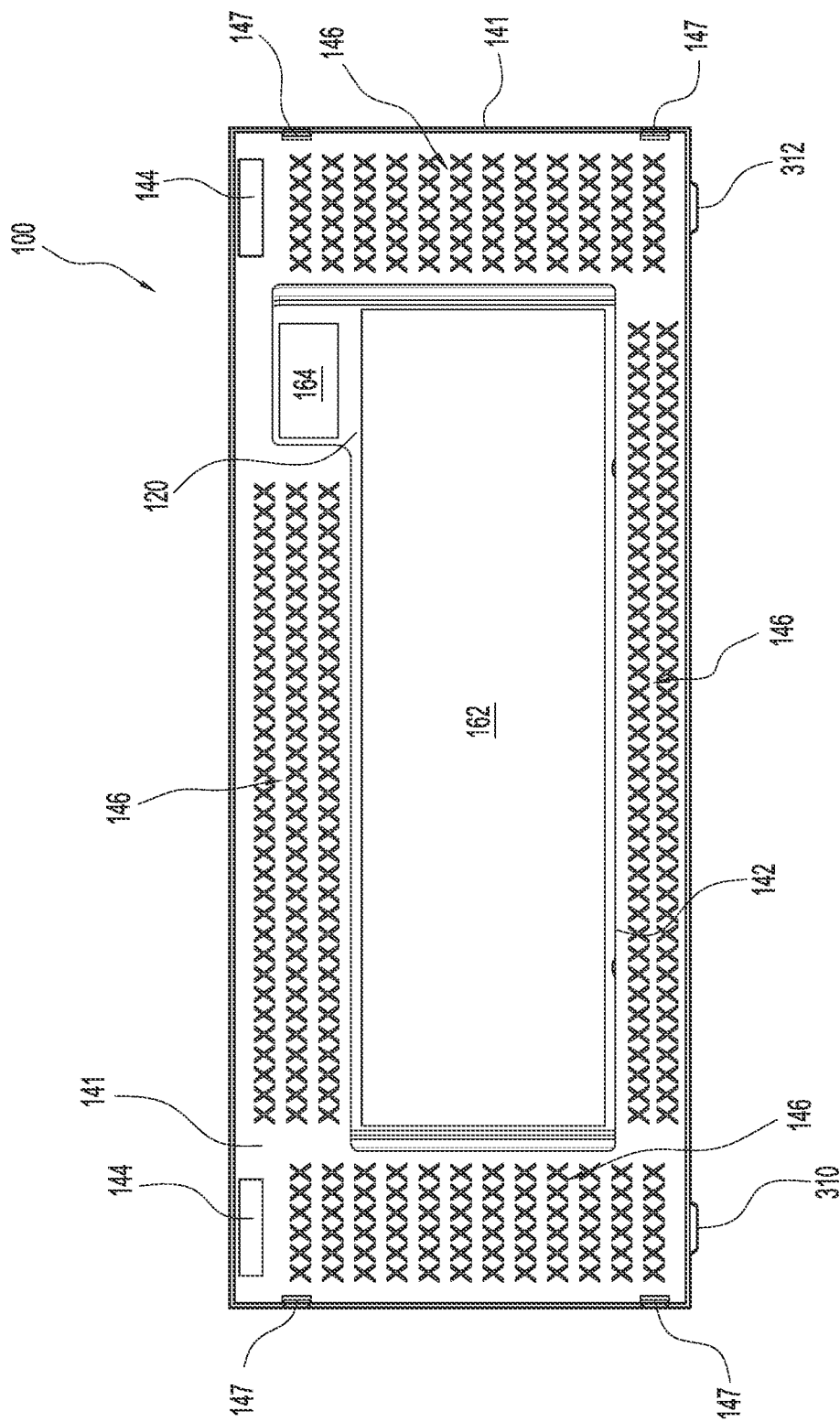
FIG. 2B is a front view of the example license plate holder of FIG. 1 in an assembled state.

FIG. 2A is a perspective view of the example license plate holder 100 of FIG. 1 in an assembled condition and FIG. 2B is a front view of the example license plate holder 100 of FIG. 1 in an assembled condition. FIGS. 2A-2B show the alignment of the example transmissive substrate 120 within the first volume of the example frame 140 and the alignment of the example frame 140 relative to the example license plate 160 and the example base 200 (not shown in FIGS. 2A-2B). FIGS. 2A-2B show that the example frame display regions 146 are viewable through, and protected by, the example transmissive substrate 120. FIGS. 2A-2B also show that the example first license plate display region 162 is viewable through the example first region 126 of the example transmissive substrate 120 and the example central opening 142 of the example frame 140. Likewise, FIGS. 2A-2B also show that the example second license plate display region 164 is viewable through the example third region 128 of the example transmissive substrate 120 and the example secondary opening 143 of the example frame 140.

FIG. 3 is an example bottom view of the assembled example license plate holder 100 of FIGS. 2A-2B, with the example front 300 of the example frame 140 and the example rear 302 of the example frame 140 being shown. FIG. 3 shows an example first boss 310 formed on a first side of the example wall 149 or bottom portion of the example frame 140 and an example second boss 312 formed on a second side of the example wall 149 of the example frame 140. FIG. 3 also shows an example first boss 310 formed on a first side of the example wall 149 or bottom portion of the example frame 140 and an example second boss 312 formed on a second side of the example wall 149 of the example frame 140. The example first boss 310 aligns with (e.g., is at least substantially coaxial with) an example third boss 615 (not shown in FIG. 3) formed on a first side of an example bottom portion 249 of the example base 200. The example second boss 312 aligns with (e.g., is at least substantially coaxial with) an example fourth boss 616 (not shown in FIG. 3) formed on a second side of an example bottom portion 249 of the example base 200. Each of the example first boss 310 and the example second boss 312 include an example through hole 311 to facilitate receipt of the example mechanical fastener 250, which connects the example first boss 310 and the example second boss 312 of the example frame 140 with, respectively, the example third boss 615 and the example fourth boss 616 of the example base 200.

Figure 4:
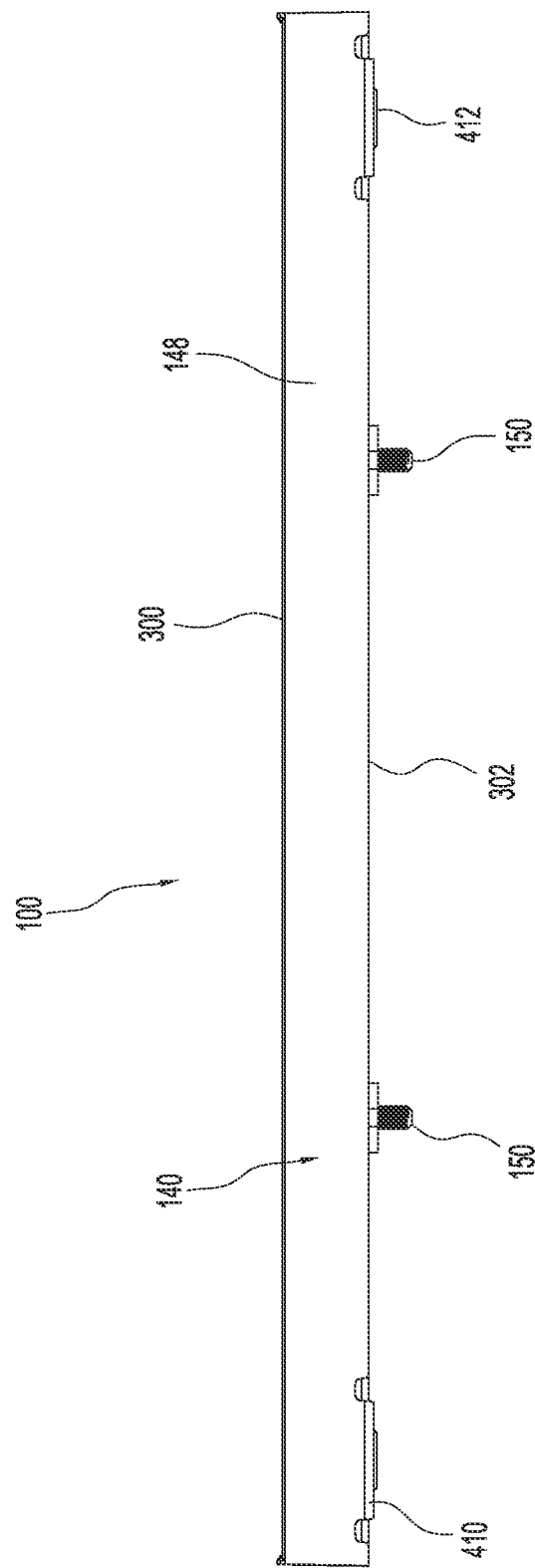
FIG. 4 is an example top view of the example license plate holder of FIGS. 1-3 in an assembled state.

FIG. 4 is an example top view of the assembled example license plate holder 100 of FIGS. 2A-3. FIG. 4 shows a top view of an example first upper rear connector 410 and an example second upper rear connector 412, which are shown more fully in FIGS. 5-6.

FIG. 5 is an example rear perspective view of the example license plate holder 100 of FIGS. 1-4 in the assembled condition and FIG. 6 is an example rear view of the example license plate holder of FIGS. 1-5. At the upper end of the assembled example license plate holder 100, FIGS. 5-6 show the example first upper rear connector 410 engaging the example ledge 710 of the example first lateral section 203 of the example base 200. FIGS. 5-6 also show the example second upper rear connector 412 engaging the example ledge 712 of the example second lateral section 204 of the example base 200. In some examples, the example ledges 710, 712 correspond to an upper portion of a recess formed in a rear portion of the example first lateral section 203 and example second lateral portion 204, respectively. In other examples, the rear surface of the example base 200 may be substantially planer and the example ledges 710, 712 may be formed to extend rearwardly therefrom.

Even in isolation (i.e., without the example rear connectors 210), the example first upper rear connector 410 and the example second upper rear connector 412 provide positive engagement with, and lockup of, the example frame 140 and the example base 200.

In FIGS. 5-6, the example mechanical fasteners 150 (e.g., screws, etc.) are shown to protrude through the example first connectors 205 (e.g., through holes, bosses, male connectors, female connectors, etc.) of the example base 200 and, in an installed condition, would connect the example license plate holder 100 to a vehicle.

The right example rear connector 210, in the view of FIGS. 5-6, comprises a mechanical fastener (e.g., a screw, etc.) inserted through the example through hole 311 of the example first boss 310 of the example frame 140 and through a corresponding one of the example adapters 215, which is in turn through or received by the example third boss 615 of the example base 200. The left example rear connector 210, in the view of FIGS. 5-6, comprises a mechanical fastener (e.g., a screw, etc.) inserted through the example through hole 313 of the example second boss 312 of the example frame 140 and through a corresponding one of the example adapters 215, which is itself inserted into or received by the example fourth boss 616 of the example base 200.

While the view of FIGS. 5-6 shows the example first lateral section 203 and the example second lateral section 204 of the example base 200 to define recesses on the rear of the example base 200, in other examples the example first lateral section 203 and the example second lateral section 204 are solid and the example third boss 615, the example fourth boss 616, and the example adapters 215 are omitted in favor of holes (e.g., threaded holes, etc.) to receive the example rear connectors 210. In some examples, rather than two example rear connectors 210 disposed at or near a first and a second lateral end of the example frame 140 and the example base 200, a single centrally disposed rear connector 210 is used to secure a lower portion of the example frame 140 to a lower portion of the example base 200.

Figure 7B:
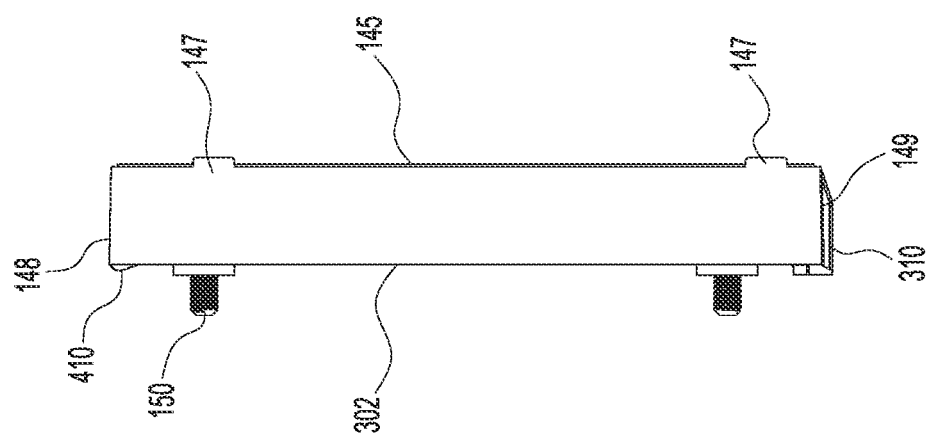
FIGS. 7A-7B are, respectively, example right side and left side views of the example license plate holder of FIGS. 1-6 in an assembled state.
Figure 7A:
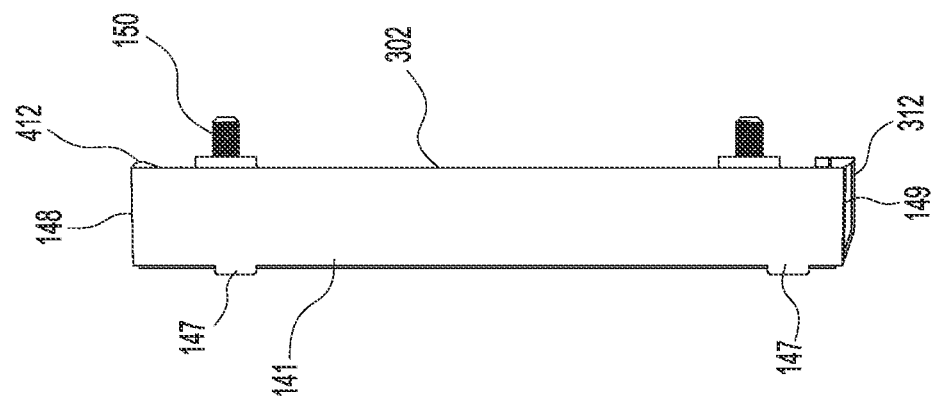

FIGS. 7A-7B are, respectively, example right side and left side views of the example license plate holder 100 of FIGS. 1-6, showing alternate views of components of the example frame 140 including the example first upper rear connector 410, the example second upper rear connector 412, the example first boss 310 and the example second boss 312.

FIGS. 8-15B are views of a second embodiment of an example license plate holder in accord with at least some of the present concepts, such second embodiment including some similarities with the example license plate holder of FIGS. 1-7B. The example second embodiment of the example license plate holder shown in FIGS. 8-15B includes, for example, a different mechanical connection between the example frame 1140 and the example base 1200 than that of the example of FIGS. 1-7B and a different mode of attachment of the example base 1200 to the example frame 1140. In the example license plate holder of FIGS. 8-15B, the example frame 1140 is positioned laterally off-center relative to the example base 1200 during assembly so that example first rear connectors 1500 on the example base 1200 (see, e.g., FIG. 8) are positioned to move laterally relative to example second rear connectors 1600 on the example frame 1140 (see, e.g., FIG. 9) from an initial mounting position to a final assembled position during assembly and the example first rear connectors 1500 and the example second rear connectors 1600 are positioned for securement relative to one another in a final, assembled position (e.g., centered) of the example frame 1140 relative to the example base 1200. In some examples, the example first rear connectors 1500 abut against and frictionally engage the example second rear connectors 1600 in the final, assembled position to restrict relative motion therebetween. In some examples, the example first rear connectors 1500 interlock with the example second rear connectors 1600 in the final, assembled position, and optionally include one or more latching elements. In some examples, one or more of the example first rear connectors 1500 include one of a male or female connection member and one or more of the example second rear connectors 1600 include another one of a male or female connection member so that the example first rear connectors 1500 lock into the example second rear connectors 1600 in the final, assembled position.

In some examples, one or more of the example first rear connectors 1500 are not as illustrated, but are rather a conventional male or female connection member and one or more of the example second rear connectors 1600 are not as illustrated, but are another one of a male or female connection member so that such first rear connector locks into the second rear connector 1600 in the final, assembled position. The example first rear connectors 1500 and the example second rear connectors 1600 may comprise any complementary shape adapted for engagement such as, but not limited to, complementary right prisms (e.g., wedge) leading to a plateau (e.g., a rectangular shape or square shape having a height equal to that of a base of the right prism), or a rack and pinion arrangement, to name but two examples.

While a certain number of and arrangement of example first rear connectors 1500 and example second rear connectors 1600 are shown in the example license plate holder 1100 of FIGS. 8-15B, the present concepts include other numbers of and/or arrangement of the example first rear connectors 1500 and example second rear connectors 1600. For instance, the present concepts include one, two, three or more sets of a first rear connector 1500 and a second rear connector 1600. The one, two, three or more sets of the first rear connector 1500 and the second rear connector 1600 may be arranged asymmetrically (e.g., a different number of and/or position sets of one or more first rear connectors and one or more second rear connectors as between a top and bottom of the example license plate holder, etc.) or on different surfaces of the example base 1200 and example frame 1140.

In some examples, the example first rear connectors 1500 and the example second rear connectors 1600 are positioned on vertical or lateral surfaces of the example frame 1140 and the example base 1200 (e.g., left surfaces and right surfaces in the orientation shown) to facilitate mounting of the frame 1140 to the base 1200 by positioning the frame 1140 vertically off-center relative to the base 1200 during assembly and moving the frame 1140 relative to the base 1200 to center the frame 1140 relative to the base 1200 in the final assembled position. In this configuration, during assembly, the second rear connectors 1600 on the frame 1140 move vertically relative to the first rear connectors 1500 on the base 1200 as the frame 1140 is moved from the initial mounting position to a final assembled position. In the final assembled position, the first rear connectors 1500 and the second rear connectors 1600 engage one another.

Further, while the example second embodiment of the example license plate holder shown in FIGS. 8-15B shows the example frame 1140 and the example base 1200 being connected at the bottom via two mechanical fasteners (e.g., screws), other variants of the designs of FIGS. 1-7B and of 8-15B optionally reduce the number of mechanical fasteners (e.g., only one screw, only one pin, etc.) or omit the use of mechanical fasteners in favor of complementary mechanical connectors (e.g., clasps, snap-fit connectors, male/female connectors, etc.) formed in the example frame and the example base.

Figure 8:
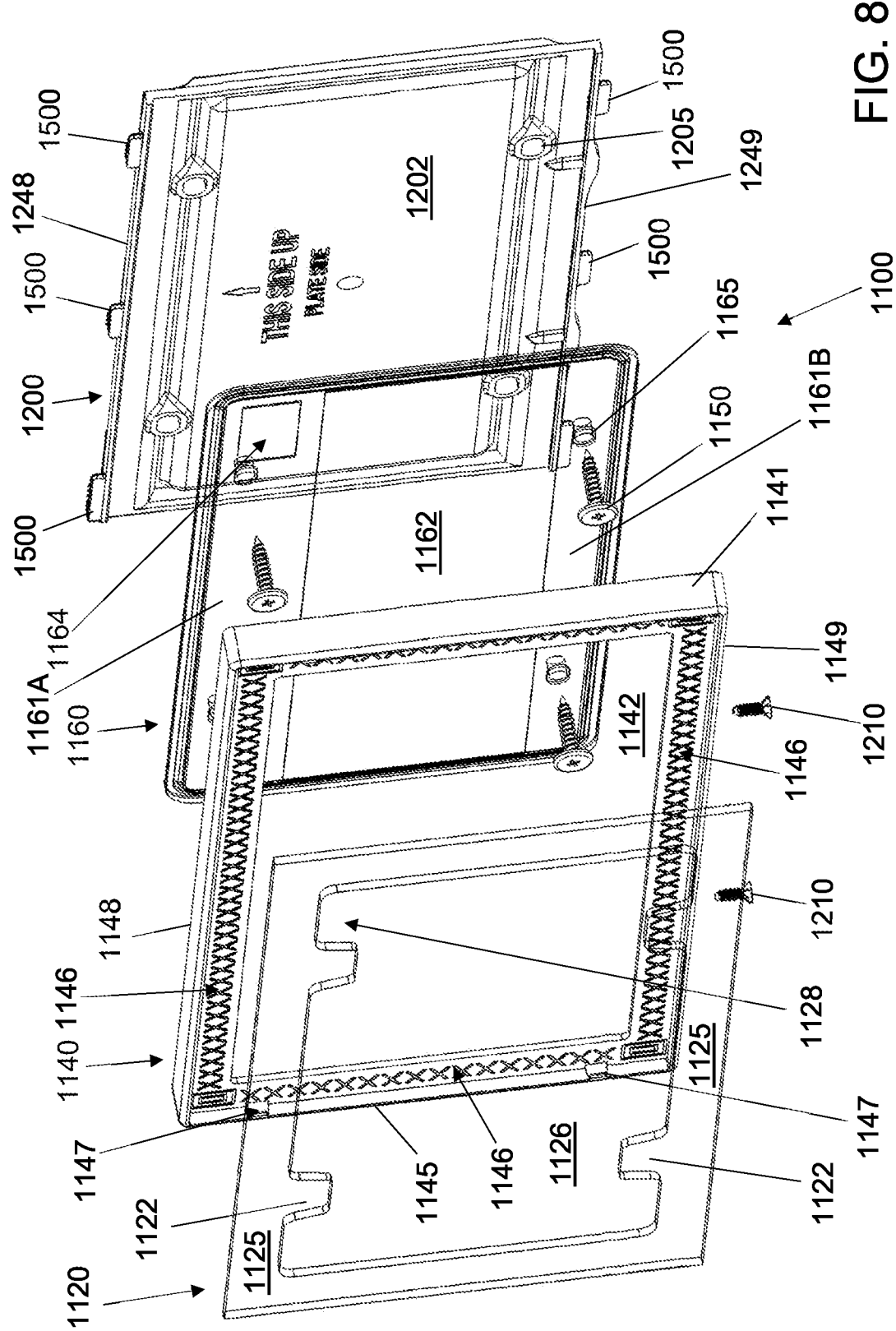
FIG. 8 is an example exploded front perspective view of a second embodiment of an example license plate holder in accord with at least some of the present concepts.

FIG. 8 is an example exploded front perspective view of the example second embodiment of an example license plate holder 1100 in accord with at least some of the present concepts. The example license plate holder 1100 is shown to include, from left-to-right, an example transmissive substrate 1120, an example frame 1140 and an example base 1200. An optional example license plate 1160 is also shown in relation to the example license plate holder 1100 for contextual illustration to show an example integration of a license plate 1160 with a license plate holder 1100 in accord with at least some aspects of the present concepts.

The example transmissive substrate 1120 may include, for instance, but is not limited to, a substrate of glass, treated or strengthened glass (e.g., Gorilla Glass (Corning), Dragontrail (AGC Inc.), Xensation (Schott AG)), Plexiglass (e.g., Lucite, Acrylite, Perspex, Oroglass Optix, Altuglass, etc.), polycarbonate, acrylic (e.g., injection molded acrylic or polymethyl methacrylate, polystyrene or PMMA. In some examples, the example transmissive substrate 1120 is a uniform substrate of a selected material. In some examples, the example transmissive substrate 1120 defines a plurality of different regions such as an example first region 1126 (e.g., a central region) having a first set of characteristics (e.g., optical properties such as refractive index, transmission/transmittance, absorption, surface finish, graphics, mechanical properties such as Young's modulus, strength, hardness, impact resistance, chemical resistance, etc.), an example second region 1125 (e.g., a peripheral region) having a second set of characteristics, an example third region 1128 having a third set of characteristics, etc. Thus, in various examples, the example transmissive substrate 1120 can have a single uniform region (i.e., uniform characteristics at least substantially throughout) or a plurality of different regions (e.g., two regions, three regions, four regions, or more than four regions) having different characteristics (e.g., different graphics, etc.). In some examples, two regions may have the same characteristics (e.g., the example first region 1126 and the example second region 1125 both having the same optical properties). In some examples, one or more of the regions could comprise an opening.

In the example of FIGS. 8-15B, the example transmissive substrate 1120 comprises a substrate of glass that is about 0.12 inches thick. In other examples, the example transmissive substrate 1120 comprises a substrate of glass that is less than 0.12 inches thick or greater than 0.12 inches thick, such as between 0.12-0.25 inches thick. In some examples, the example transmissive substrate 1120 is uniform, with substantially uniform characteristics throughout. In some examples, the example transmissive substrate 1120 defines a plurality of different regions, such as an example first region 1126 (e.g., a central region) having a first set of characteristics (e.g., a first set of optical properties) and an example second region 1125 (e.g., a peripheral region) having a second set of characteristics (e.g., a second set of optical properties). In one example, for instance, the example first region 1126 is clear and the example second region 1125 is slightly opaque. In another example, the example first region 1126 is clear and the example second region 1125 includes paint, metallization, a silkscreen, or an appliqué (e.g., a sticker). In some examples, the example first region 1126 and the example second region 1125 have the same characteristics. It is to be noted that, while the example second region 1125 (e.g., a peripheral region) is shown to be symmetric, the example second region 1125 may be asymmetric, non-uniform or stylized (e.g., a silk-screened second region 1125 defining a first region 1126 that is a transparent rectangle offset at an angle relative to the perimeter of the example transmissive substrate 1120, a silk-screened second region 1125 that depicts flames or waves, etc.).

In the example transmissive substrate 1120 shown in FIG. 8, the example first region 1126 generally corresponds in size to a display area (e.g., a DIN 1451 license plate number) of an example license plate (e.g., example license plate 1160) to be incorporated into the example license plate holder 1100 (e.g., a United States license plate, a European license plate, a Chinese license plate, etc.). For instance, in some examples, the example first region 1126 is less than 12.0"×6.0" (305 mm×152 mm) for a United States license plate, less than 20.5"×4.3" (520 mm×110 mm) for a license plate of some European countries, or 17.3"×5.5" (440 mm×140 mm) for a Chinese license plate. In some examples, the example first region 1126 is a cutout in the example transmissive substrate 1120. In some examples, the example first region 1126 includes an example lateral region 1128 to facilitate display of an emblem or sticker (e.g., a governmental vehicle registration sticker, tax stamp etc.), such lateral region 1128 being sized and located in a position required by the local jurisdiction. In some examples, the example lateral region 1128 is a different size (e.g., larger, smaller, etc.) and/or location than that shown in the example transmissive substrate 1120 of FIG. 8 to comport with sizing and/or location requirements of any particular jurisdiction for the display of an emblem or sticker (e.g., a governmental vehicle registration sticker, tax stamp etc.). For instance, in the example of FIG. 8, the symmetry of the example transmissive substrate 1120 provides regions corresponding to the example lateral region 1128 on the upper left side, as well as on the bottom left and bottom right, of the example transmissive substrate 1120.

The example frame 1140 defines an example central opening 1142 to permit display of indicia, such as the license plate number, on an example first license plate display region 1162. In some examples, such as is shown in FIG. 8, the example central opening 1142 is a singular opening that reveals, through the example central opening 1142, all portions of the underlying example license plate 1160 including the example first license plate display region 1162, the example second license plate display region 1164, the example third license plate display region 1161A, and the example fourth license plate display region 1161B.

In other examples, the example central opening 1142 may alternatively be sized differently (e.g., larger, smaller, etc.) to comport with sizing and/or location requirements of any particular jurisdiction and/or to selectively reveal or obscure, for instance, the example third license plate display region 1161A and/or the example fourth license plate display region 1161B.

In the example of FIGS. 8-15B, the example second region 1125 of the example transmissive substrate 1120 defines a plurality of example salients 1122 extending inwardly toward the example first region 1126. In some examples, these example salients 1122 are sized and spaced so as to partially or fully visually obscure one or more of (e.g., some of or all of) the example mechanical fasteners 1150 used to secure the example license plate 1160 to the example base 1200 and/or vehicle. The example salients 1122 may have the same characteristics as the example second region 1125 (e.g., a second set of optical properties) or different characteristics from the example second region 1125 (e.g., a third set of optical properties). In some examples, a shape and/or characteristic of the example salients 1122 may reflect a selected theme of the example license plate holder 1100. In one example, for instance, the example first region 1126 is clear and the example second region 1125 includes graphics evocative of a beach theme, with the example salients 1122 taking the form of an ellipse (e.g., graphics of a surf board in sand) or a semi-circle (e.g., graphics of a beach ball). As another example, the example first region 1126 is clear and the example second region 1125 includes graphics evocative of a sports theme, the example salients 1122 taking the form of an ellipse (e.g., graphics of a football) or a semi-circle (e.g., graphics of a soccer ball). It is to be noted that the example salients 1122 may comprise a uniform shape or form, such as is shown in the example of FIG. 8, or may comprise different shapes or forms (e.g., two, three, four or more different shapes, etc.) adapted to partially or fully visually obscure one or more of (e.g., some of or all of) the example mechanical fasteners 1150 used to secure the example license plate 1160 to the example base 1200 and/or vehicle.

In some examples, the example central opening 1142 of the example frame 1140 is less than about 305 mm×152 mm (12.0"×6.0") and is sized so as not to obscure a first license plate display region 1162 (e.g., a license plate number) for a United States vehicle license plate. In some examples, the example central opening 1142 is less than about 520 mm×110 mm (20.5"×4.3") and is sized so as not to obscure a first license plate display region 1162 (e.g., a license plate number) for a vehicle license plate in some European countries. Likewise, in other examples, the example central opening 1142 is less than about 305 mm×152 mm (12.0"×6.0"), 305 mm×160 mm (12.0"×6.3"), 372 mm×135 mm (14.6" 5.3"), 440 mm×120 mm (17.3"×4.7"), 300 mm×80 mm (11.8"×3.1"), or 440 mm×140 mm (17.3"×5.5").

The example frame 1140 further defines one or more example frame display regions 1146 adjacent the example central opening 1142. In the example of FIG. 8, the example frame 1140 is shown to define a plurality of frame display regions 1146, more particularly, four example frame display regions 1146. The example frame 1140 of FIG. 8 includes an example bottom frame display region 1146 below an example bottom edge of the example central opening 1142, an example first lateral frame display region 1146 adjacent an example first lateral edge of example central opening 1142, an example second lateral frame display region 1146 adjacent an example second lateral edge of example central opening 1142, or an example upper frame display region 1146 above an example top edge of the example central opening 1142. The one or more example frame display regions 1146 include text and/or graphics, which are generically represented in FIG. 8 by fields or arrays of "X" indicia. In some examples, one or more of the example frame display region(s) 1146 include(s) user-selectable text or graphics (e.g., selected from a list of options provided on a website, custom printed, etc.), such as may be associated with sports team logos, organizations, colleges or universities, companies, phrases, causes, etc.

In another example, the one or more example frame display regions 146, 1146 are omitted and, instead, one or more example transmissive substrate 120, 1120 display regions (not shown) are provided with text and/or graphics (e.g., printed on a front side and/or a back side of the transmissive substrate 120, 1120, an appliqué on a front side and/or a back side of the transmissive substrate 120, 1120, etc.). In some examples, such text and/or graphics provided on one or more regions of the example transmissive substrate 120, 1120 includes user-selectable text or graphics (e.g., selected from a list of options provided on a website, custom printed, etc.), such as may be associated with sports team logos, organizations, colleges or universities, companies, phrases, causes, etc.

The example frame 1140 of FIG. 8 defines a plurality of contiguous walls including an example first wall 1141, an example second wall 1145, an example third wall 1148 and an example fourth wall 1149. The example walls 1141, 1145, 1148, 1149 extend forwardly to define a first volume (not numbered) at the front of the example frame 1140 to receive the example transmissive substrate 1120. The example walls 1141, 1145, 1148, 1149 also extend rearwardly to define a second volume (not numbered) at the rear of the example frame 1140 to receive the example license plate 1160 and at least a portion of the example base 1200. In some examples, the example walls 1141, 1145, 1148, 1149 extend both forwardly and rearwardly. In some examples, a first set of walls extends forwardly and a second set of walls extends rearwardly.

While a plurality of example walls 1141, 1145, 1148, 1149 are shown in the example frame 1140 of FIG. 8, a lesser number of walls could be provided and/or the configuration of the walls altered. For instance, while not a presently preferred example, the example walls 1141, 1145, 1148, 1149 could extend rearwardly, but not forwardly, and instead of the example transmissive substrate 1120 being received within the first volume defined by the example walls 1141, 1145, 1148, 1149, the example transmissive substrate 1120 could instead positively connect to the example frame 1140 via a plurality of mechanical connectors (e.g., male/female connectors) formed on the example transmissive substrate 1120 to matingly engage with correspondingly configured and positioned female (or male) connectors formed on the example frame 1140 and/or via a plurality of mechanical fasteners (e.g., screws, etc.).

In yet another example, the frame 1140 could include a subset of the walls of FIG. 8, such as only wall 1149 or only wall 1148. In such example, the example transmissive substrate 1120 could positively connect to the example frame 1140 (e.g., to the wall 1149 or the wall 1148, etc.), via a plurality of male (or female) connectors (e.g., snap fit connectors, etc.) formed on the example transmissive substrate 1120 to matingly engage with correspondingly configured and positioned female (or male) connectors formed on the example frame 1140 and/or via a plurality of mechanical fasteners (e.g., screws, etc.).

The example frame 1140 includes one or more example front connector(s) 1147 to removably attach the example transmissive substrate 1120 to the front of the example frame 1140. It the example of FIG. 8, the example frame 1140 includes four example front connectors 1147 disposed adjacent a front of the example frame 1140. The four example front connectors 1147 are cantilevered snap-fit connectors, having a head that is chamfered or tapered at a top surface, to facilitate biasing of the heads away from the first volume upon movement of the example transmissive substrate 1120 into the first volume, wherein lateral edges of the example transmissive substrate 1120 contact the chamfered or tapered top surfaces of the heads of the example front connectors 1147 and slightly bias the heads outwardly. Following passage of the example transmissive substrate 1120 into the first volume and past a bottom surface of the head, where it no longer outwardly biases the heads of the example front connectors 1147, the heads returns to their initial positions and lower surfaces of the heads facilitate retention of the example transmissive substrate 1120 within the first volume. For instance, in some examples, the lower surfaces of the heads of the example front connectors 1147 are at flat and are at least substantially parallel to the front surface of the example transmissive substrate 1120 such that the heads would have to be manually or digitally biased outwardly to facilitate removal of the example transmissive substrate 1120. While four example front connectors 1147 are shown, a greater number (e.g., five, six, etc.) or a lesser number (e.g., one, two, three) could alternatively be implemented in the example frame 1140. Likewise, different forms of example front connectors 1147 (e.g., male/female connectors, mechanical connectors, fasteners, etc.) may be implemented to facilitate removable attachment of the example transmissive substrate 1120 to the example frame 1140.

FIG. 8 also shows an example license plate 1160, which may be formed from a variety of materials, such as plastic or metal (e.g., aluminum, steel, an alloy, etc.) or, in some instances, from card stock (e.g., a temporary tag). The example license plate 1160 includes an example first license plate display region 1162 for display of a license plate number and additional relevant information (e.g., a state of issuance, a state motto, etc.) and an example second license plate display region 1164 for display of an emblem or a sticker (e.g., a governmental vehicle registration sticker, etc.) that may be required in a given jurisdiction. In some examples, the example license plate 1160 includes a third license plate display region (e.g., 1161A) and/or a fourth license plate display region (e.g., 1161B).

The example license plate 160 includes a plurality of example through holes 1165 to receive example mechanical fasteners 1150 (e.g., screws, etc.) to secure the example license plate 1160 to the example base 1200 and/or to the vehicle itself which bears the example license plate holder 1100.

As discussed further in relation to FIGS. 9A-15B below, the example frame 1140 includes one or more rear connectors (not shown in FIG. 8) disposed adjacent a rear of the example frame 1140 to removably attach the rear of the example frame 1140 to the example base 1200.

As noted above, the example license plate 1160 may include any dimension specified by any jurisdiction including, but not limited to, for example, 305 mm×152 mm (12.0"×6.0"), 520 mm×110 mm (20.5"×4.3"), or 440 mm×140 mm (17.3"×5.5") to name but a few examples.

The example base 1200 of FIG. 8 includes an example central section 1202 having one or more example first connectors 1205 (e.g., through holes, bosses, male connectors, female connectors, etc.) for attaching the example base 1200 to a vehicle. The example central section 1202 optionally defines a recessed volume within which the example license plate 1160 may be received or a raised volume against which the example license plate 1160 may be secured. For instance, the recessed volume of the example central section 1202 has an area sufficient to receive an example license plate 1160 of a jurisdiction of relevance (e.g., greater than about 305 mm×152 mm (12.0"×6.0") in the United States, greater than about 440 mm×140 mm (17.3"×5.5") in China, etc.). In some examples, the example central section 1202 is substantially planar.

The exploded view of FIG. 8 shows, at a bottom portion of the example frame 1140, example rear connectors 1210 (e.g., mechanical fasteners, etc.), discussed further below in relation to FIGS. 9-15B, which are inserted through corresponding openings (not shown in FIG. 8) in the example frame 1140 and openings (not shown in FIG. 8) in the example base 200 to secure a lower portion of the example frame 1140 to a lower portion of the example base 1200.

Figure 9A:
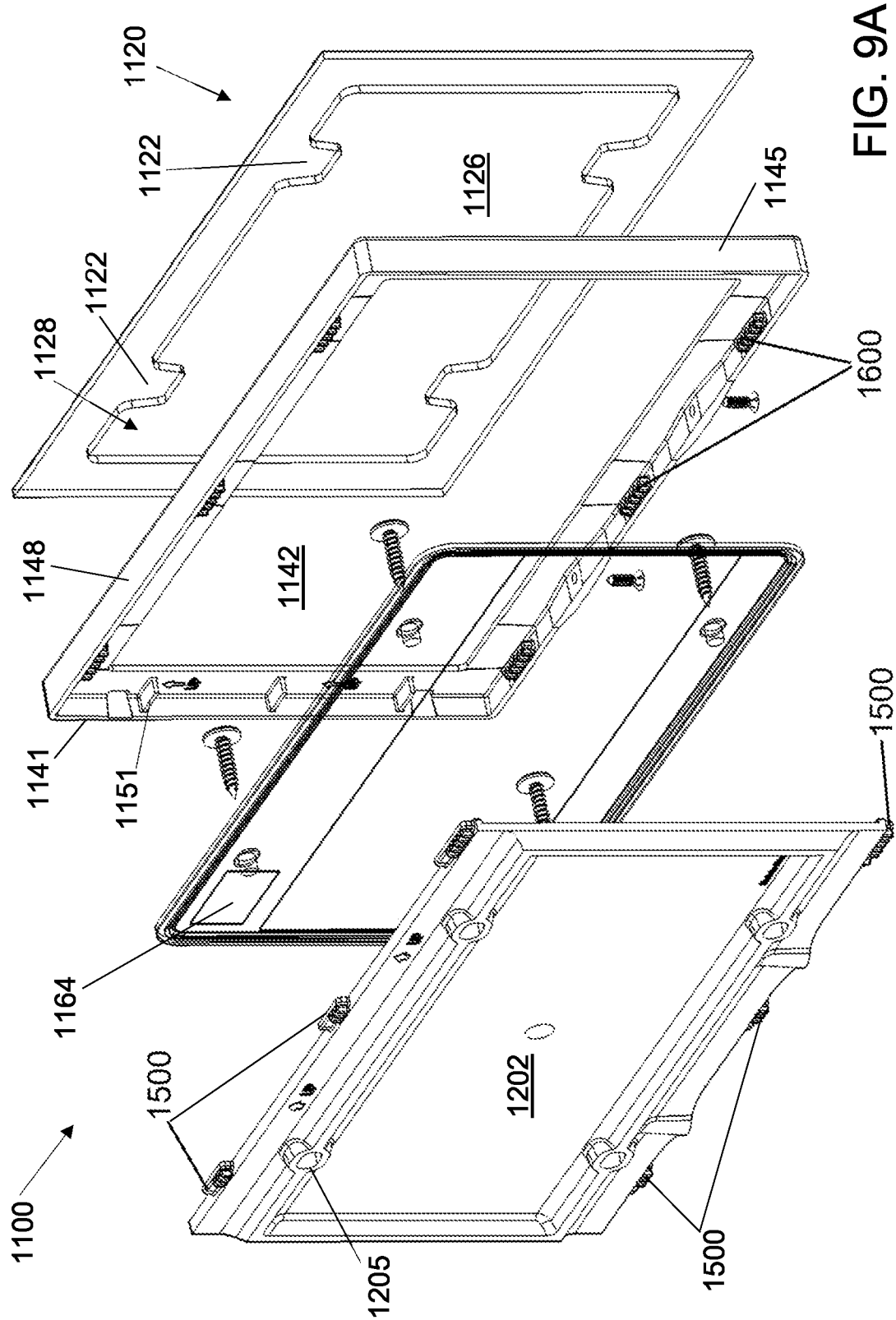
FIG. 9A is an example rear exploded perspective view of the example license plate holder of FIG. 8.

FIG. 9A is an example rear exploded perspective view of the example license plate holder of FIG. 8. Further to FIG. 8, FIG. 9A shows a plurality of example first rear connectors 1500 on upper and lower positions of the example base 1200 and a corresponding plurality of example second rear connectors 1600 on upper and lower positions of the example frame 1140. FIG. 9A also shows a plurality of example stops 1151 at a left-hand side of the frame, when viewed from the rear. As noted above, when the example frame 1140 of FIGS. 8-15B is mounted to the example base 1200 after the example base 1200 is fixed in place (e.g., to a vehicle), the example frame 1140 is positioned laterally off-center from the example base so that the example first rear connectors 1500 and the example second rear connectors 1600 are similarly laterally off-center from one another and the example first rear connectors 1500 and the example second rear connectors 1600 engage one another as the example frame 1140 is translated (e.g., toward the right) until a rightmost edge of the example license plate 1160 or the example base 1200 contacts the example stops 1151 at a centered position of the example frame 1140.

It is to be noted that both the placement of, and the number of, the example first rear connectors 1500 and the example second rear connectors 1600 may be varied and may include a lesser number (e.g., one or more sets of the example first rear connector 1500 and the example second rear connector 1600) or a greater number than that illustrated. Additionally, while one example manner of example first rear connector 1500 and example second rear connector 1600 are depicted, the physical makeup of the example first rear connector 1500 and example second rear connector 1600 may manifest in other form factors, such as a male connector and a female connector or latches. In some examples, the example first rear connector 1500 and example second rear connector 1600 may comprise magnetic connectors (e.g., neodymium magnets). In some examples, the example license plate holder 1100 may include a first set of an example first rear connector 1500 and example second rear connector 1600 that is different in structure and/or operation than a second set of an example first rear connector 1500 and example second rear connector 1600. In other words, the example first rear connectors 1500 and the example second rear connectors 1600 need not be identical.

Figure 9B:
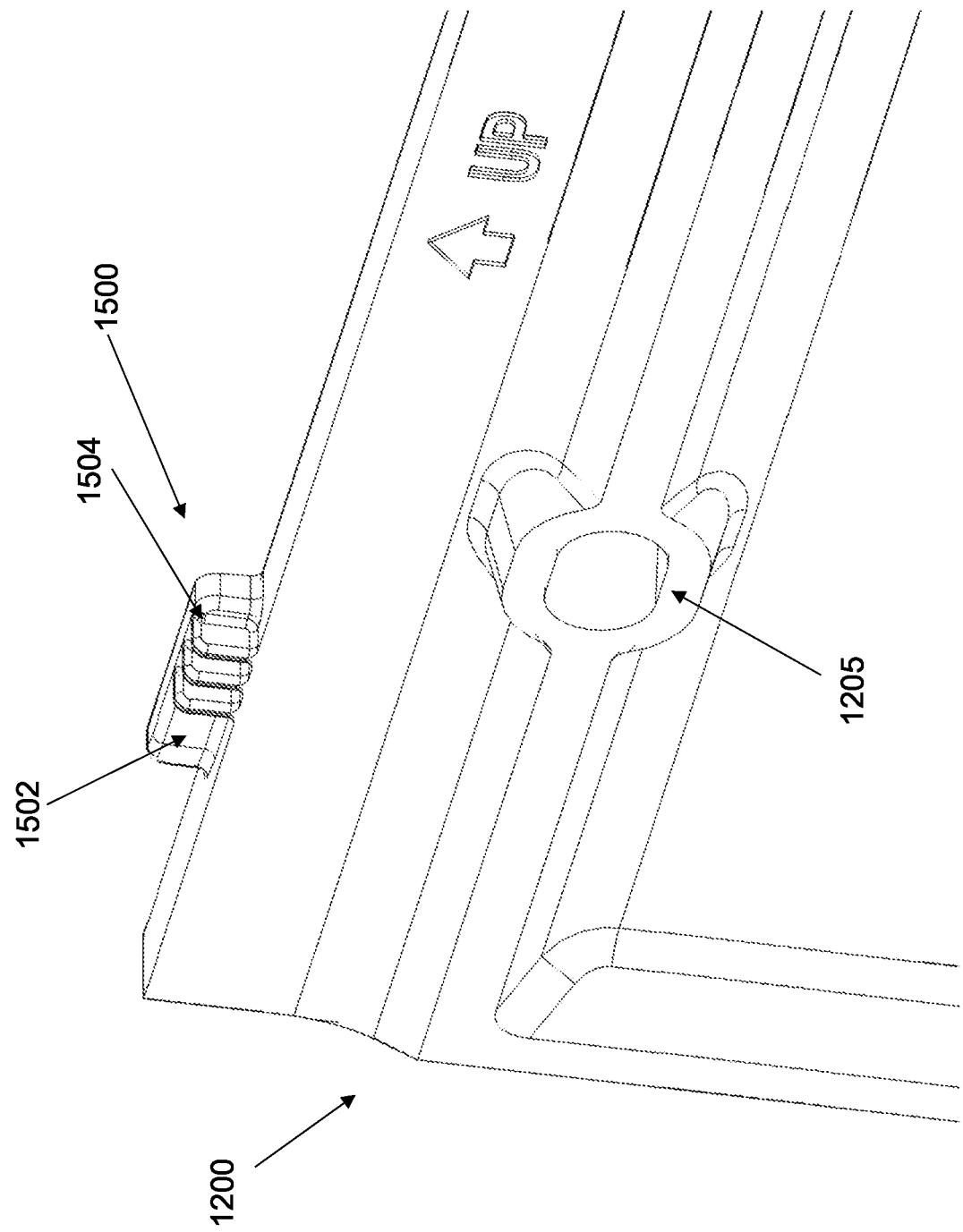
FIG. 9B is an example rear close-up view of a portion of the example license plate holder of FIG. 9A showing an example connector.

FIG. 9B shows an example rear close-up view of a portion of the example base 1200 of FIG. 9A showing an example first rear connector 1500. The example first rear connector 1500 of FIG. 9B includes an example first portion 1502 that includes a substantially flat sliding or bearing surface (e.g., positioned in a middle portion of the example first portion 1502) and an example second portion 1504 that includes one or more example protuberances (e.g., ribs, projecting members, etc.). In some examples, the example second portion 1504 is omitted and the example first rear connector 1500 includes a substantially flat sliding or bearing surface along substantially an entire length thereof.

Figure 10A:
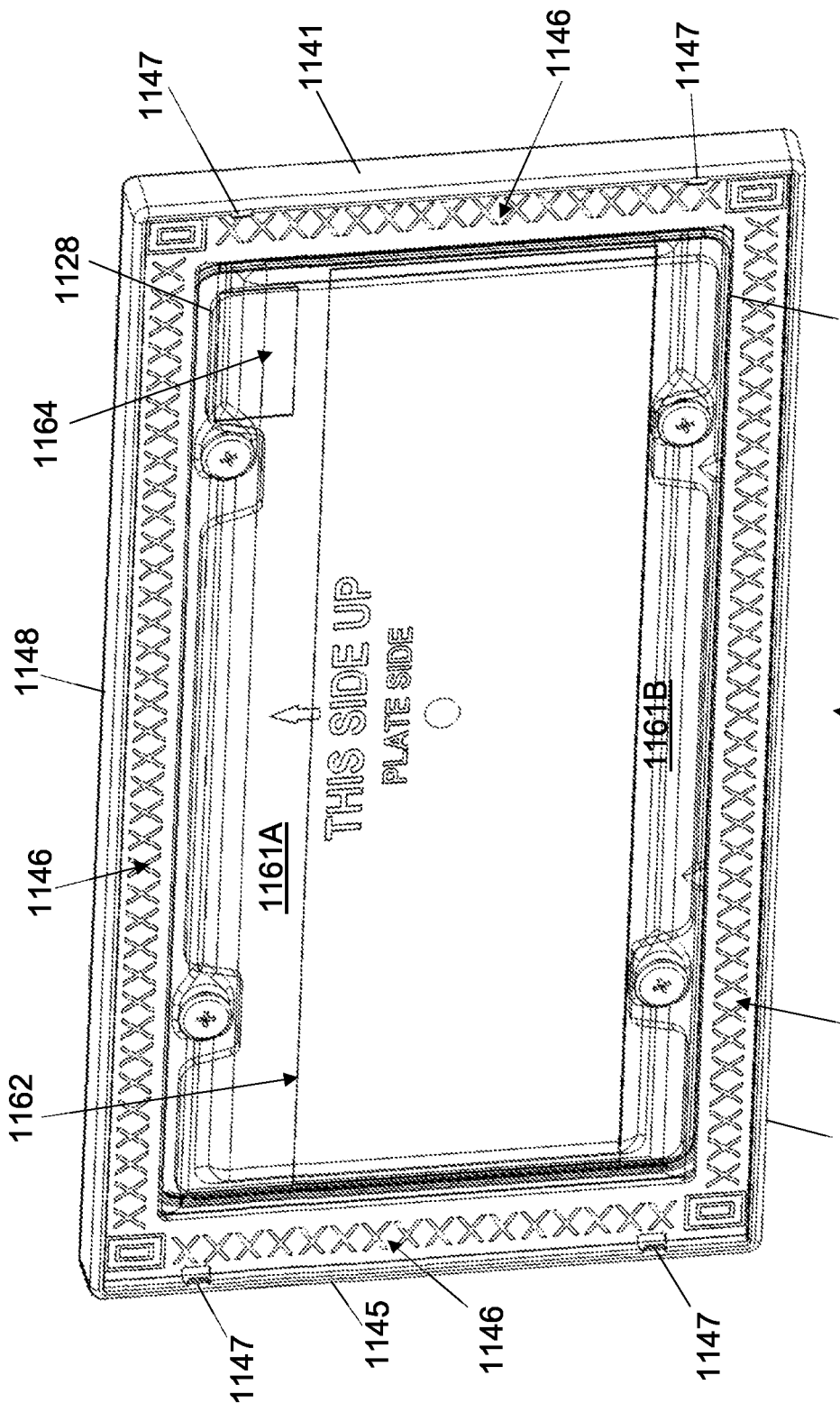
FIG. 10A is a front perspective view of the example license plate holder of FIGS. 8-9B in an assembled state.
Figure 10B:
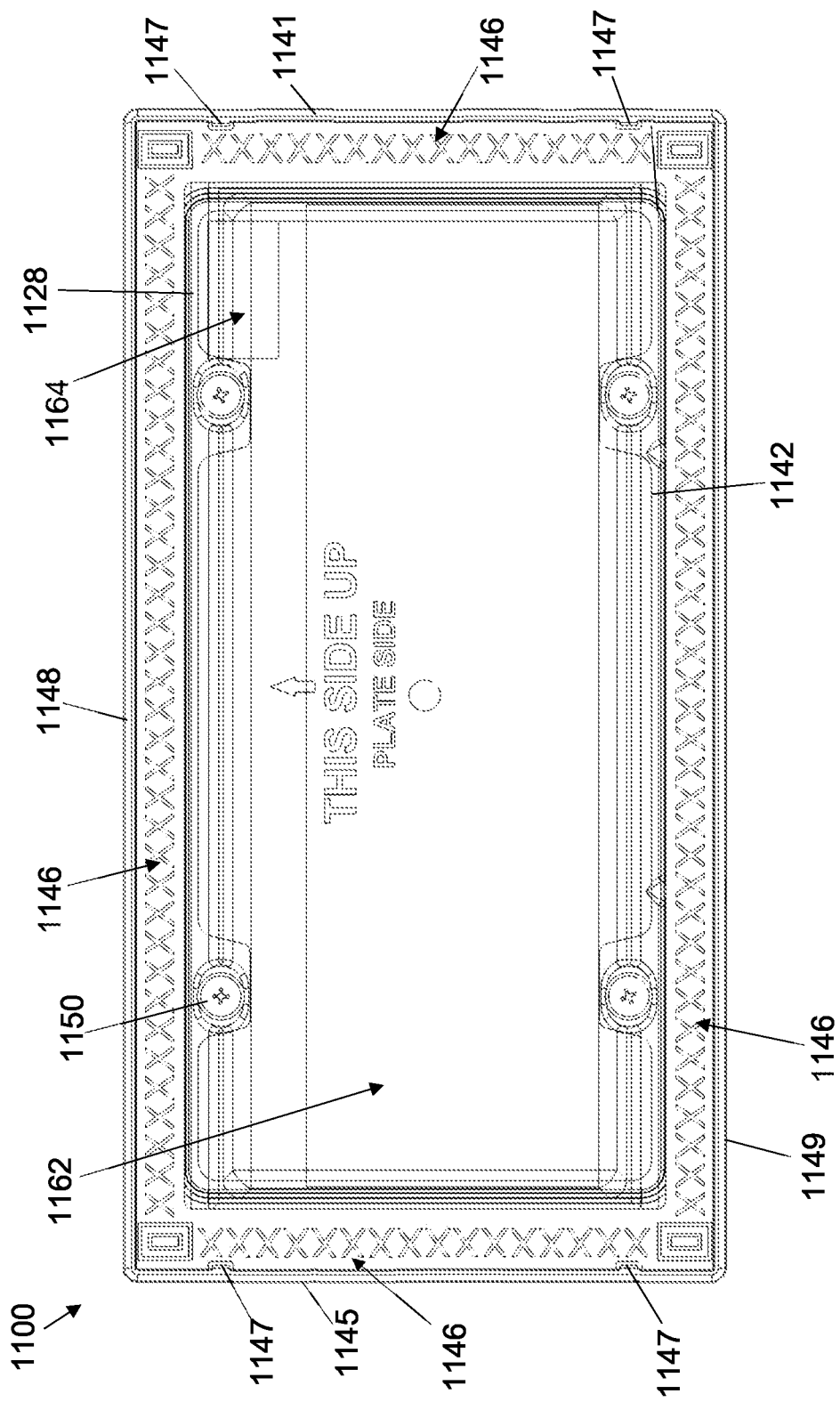
FIG. 10B is a front view of the example license plate holder of FIGS. 8-10A in an assembled state.

FIG. 10A is a front perspective view of the example license plate holder of FIGS. 8-9B in an assembled state. FIG. 10B is a front view of the example license plate holder of FIGS. 8-10A in an assembled state. FIGS. 10A-10B show the alignment of the example transmissive substrate 1120 within the first volume of the example frame 1140 and relative to the example front connectors 1147. FIGS. 10A-10B also show the alignment of the example transmissive substrate 1120 relative to the example first license plate display region 1162 and the example second license plate display region 1164 of the example license plate 1160, such regions being viewable through the example lateral region 1128 of the example transmissive substrate 1120 and the example central opening 1142 of the example frame 1140, respectively.

Figure 11:
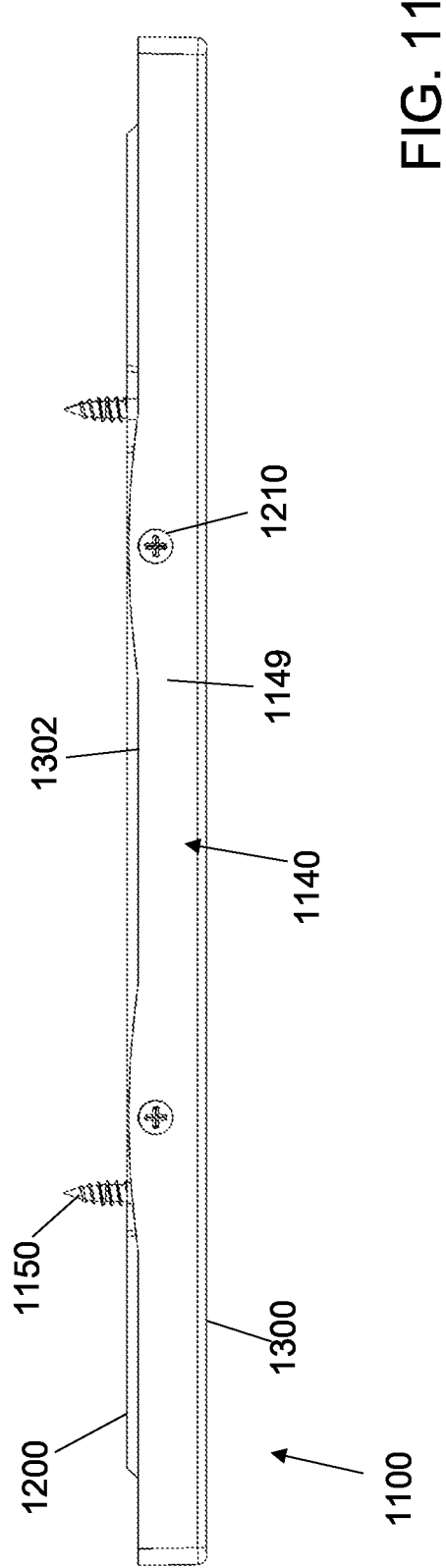
FIG. 11 is an example bottom view of the example license plate holder of FIGS. 8-10B in an assembled state.
Figure 12:
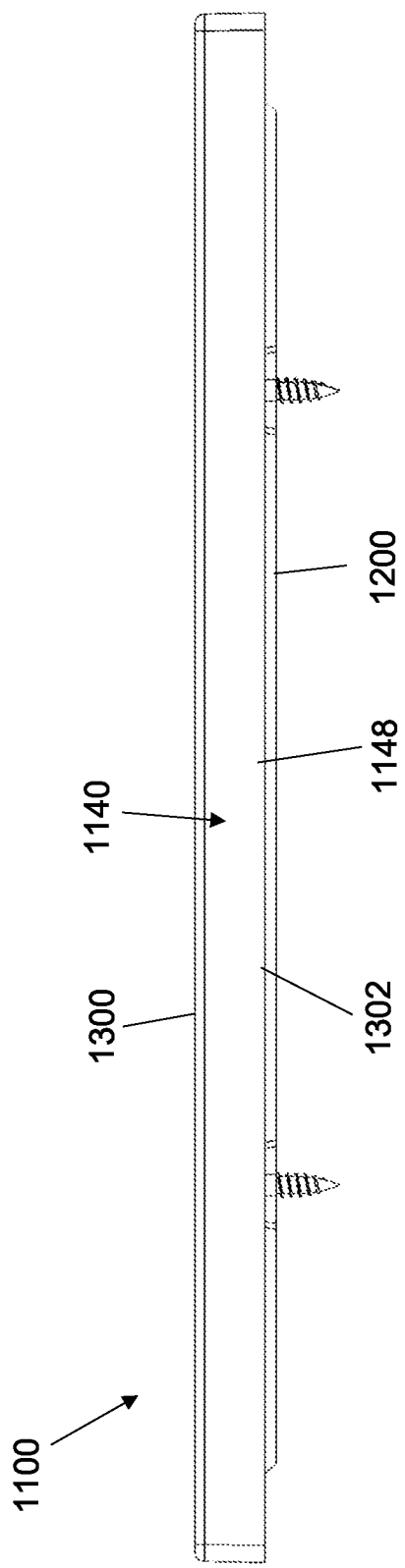
FIG. 12 is an example top view of the example license plate holder of FIGS. 8-11 in an assembled state.

FIGS. 11-12 are an example bottom view and an example top view, respectively, of the example license plate holder 1100 of FIGS. 8-10B in an assembled state, with the example front 1300 of the example frame 1140 and the example rear 1302 of the example frame 1140 being shown. The example frame 1140 is shown to include two example regions openings (not numbered) in which example mechanical fasteners 1210 (e.g., screws, etc.) are disposed to pass through corresponding positioned and dimensioned openings in the example base 1200 to enhance securement of the example frame 1140 to the example base 1200. Example mechanical fasteners 1150, which connect the example license plate holder 1100 to a vehicle, are shown to extend from the rear of the example base 1200.

Figure 13:
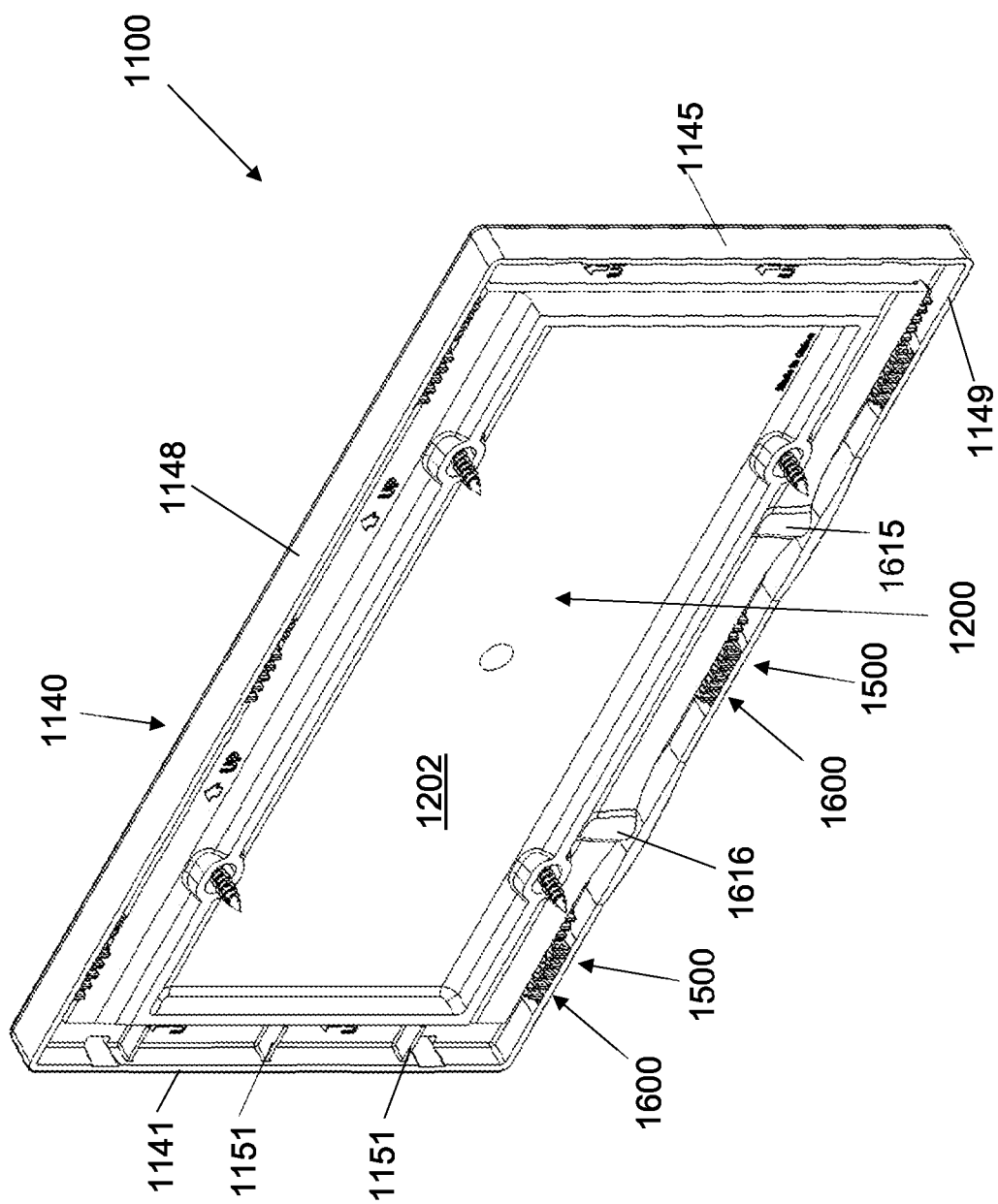
FIG. 13 is an example rear perspective view of the example license plate holder of FIGS. 8-12 in an assembled state.
Figure 14A:
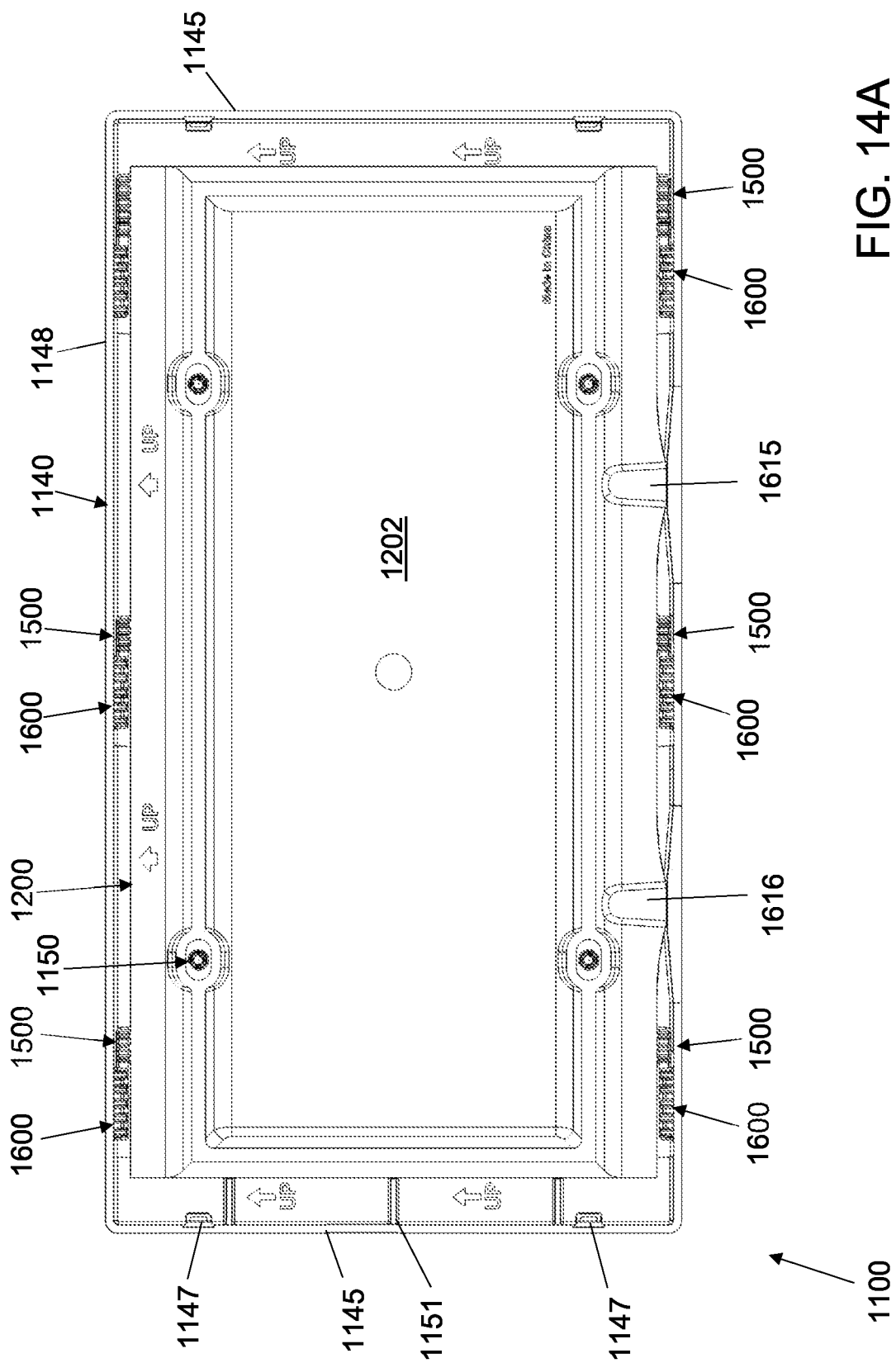
FIG. 14A is an example rear view of the example license plate holder of FIGS. 8-13 in an assembled state.
Figure 14B:
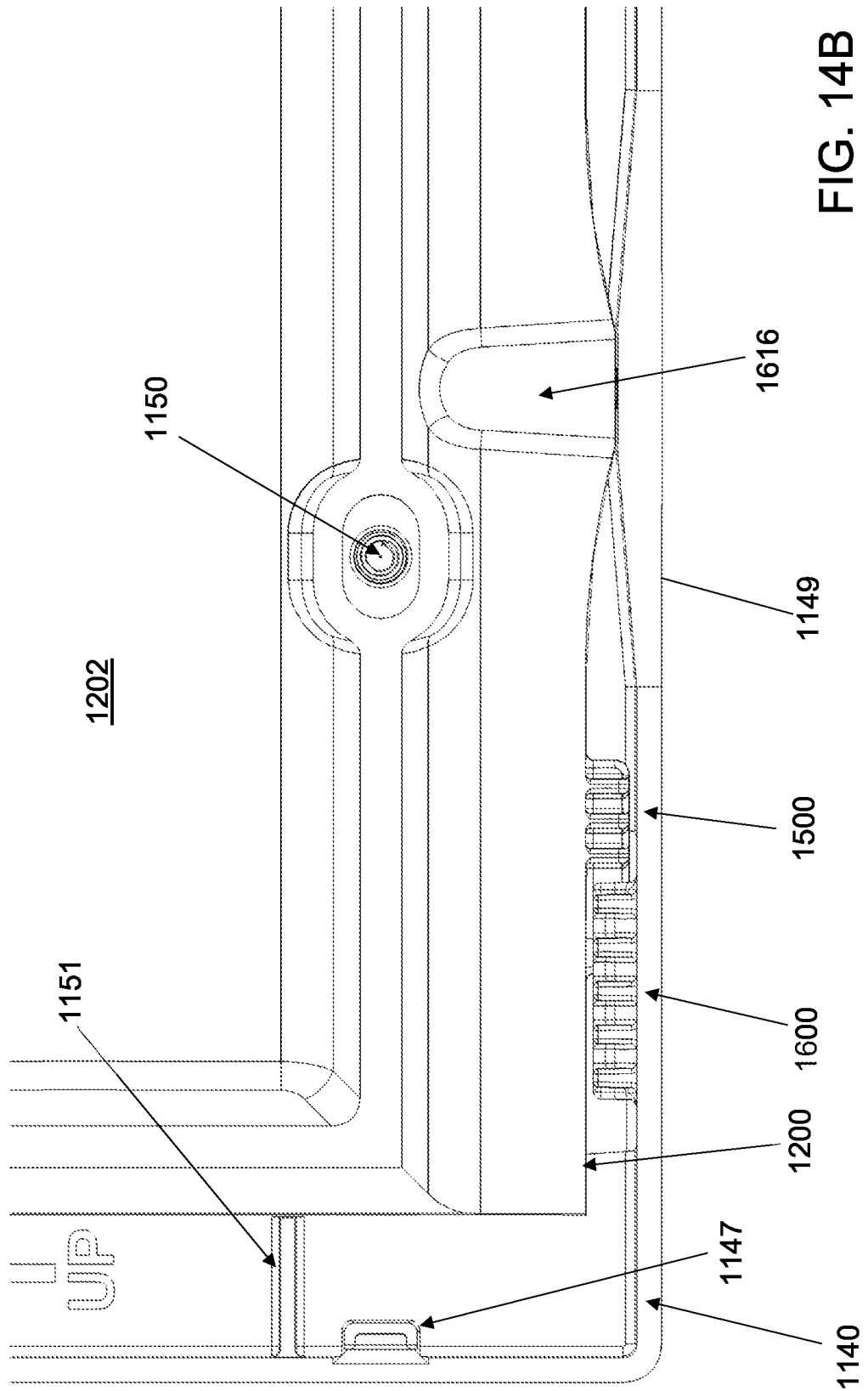
FIG. 14B is a close-up rear view of a portion of the example license plate holder of FIG. 14A showing an example connection between components of the example license plate holder.

FIG. 13 is an example rear perspective view of the example license plate holder 1100 of FIGS. 8-12 in an assembled state. FIGS. 14A-14B are, respectively, an example rear view of the example license plate holder 1100 of FIGS. 8-13 in an assembled state and a close-up rear view of a portion of the example license plate holder 1100 of FIG. 14A showing an example connection between components of the example license plate holder 1100. At an example upper end and at an example lower end of the assembled example license plate holder 1100, FIGS. 13-14B show the example first rear connectors 1500 on the example base 1200 engaged (e.g., interlocking, frictional engagement, abutting, etc.) with the example second rear connectors 1600 on the example frame 1140 to resist lateral translation and rotation of the example frame 1140 relative to the example base 1200. In the assembled views of FIGS. 13-14B, the lateral edge of the example base 1200 can be seen to abut against the example stop(s) 1151 of the example frame 1140. In some examples, the example license plate holder 1100 omits the example stop(s) 1151 entirely. In such example, the example license plate holder 1100 may optionally utilize of the example second portion 1504 of one or more of the example first rear connectors 1500 as a mechanical stop.

In the views of FIGS. 13-14B, the example mechanical fasteners 1210 (e.g., screws, etc.) shown in FIGS. 9A and 11 are disposed within the example first boss 1616 and the example second boss 1615 formed in the example base 1200 to secure the example frame 1140 to the example base 1200. In some examples, only one example mechanical fastener 1210 is used to secure the example frame 1140 to the example base 1200. In some examples the example mechanical fastener(s) 1210 are optionally omitted in favor of a more positive lockup between one or more of the example first rear connectors 1500 and a corresponding one or more of the example second rear connectors 1600 (e.g., a locking male/female connector, etc.). In other examples, the example mechanical fastener 1210 could comprise a pin or dowel disposed through the example frame 1140 and into the example base 1200 to prevent relative motion of the example frame 1140 relative to the example base and/or the example license plate 1160, such as a pin inserted through an upper portion of the example frame 1140 and into the example base, such pin being retained in place by gravity and/or an adhesive (e.g., Loctite, etc.). In other examples, the mechanical fastener 1210 could comprise one or more springs, or a mechanical insert, to bias a lateral edge of the example base 1200 or a lateral edge of the example license plate 1160 against the example stops 1151 of the example frame 1140.

Figure 15B:
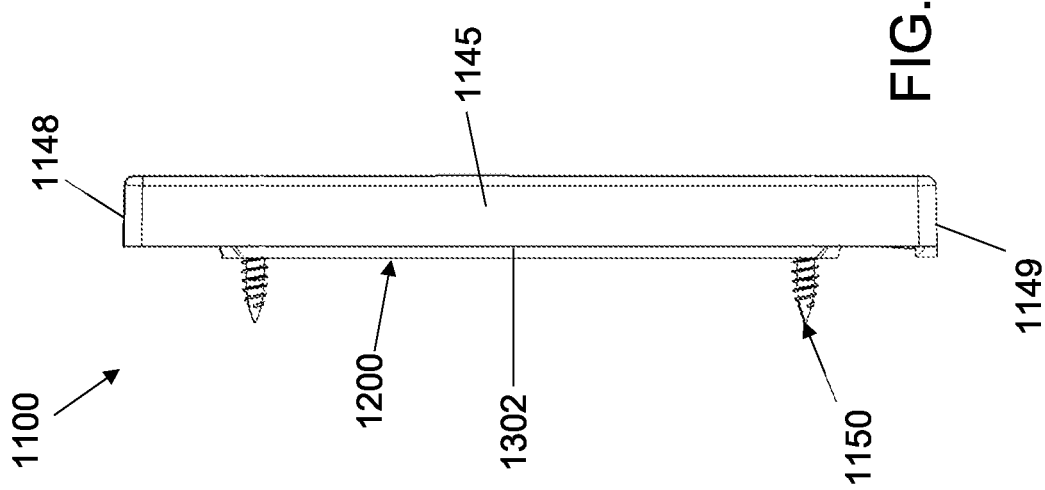
FIGS. 15A-15B are, respectively, example right side and left side views of the example license plate holder of FIGS. 8-14B in an assembled state.
Figure 15A:
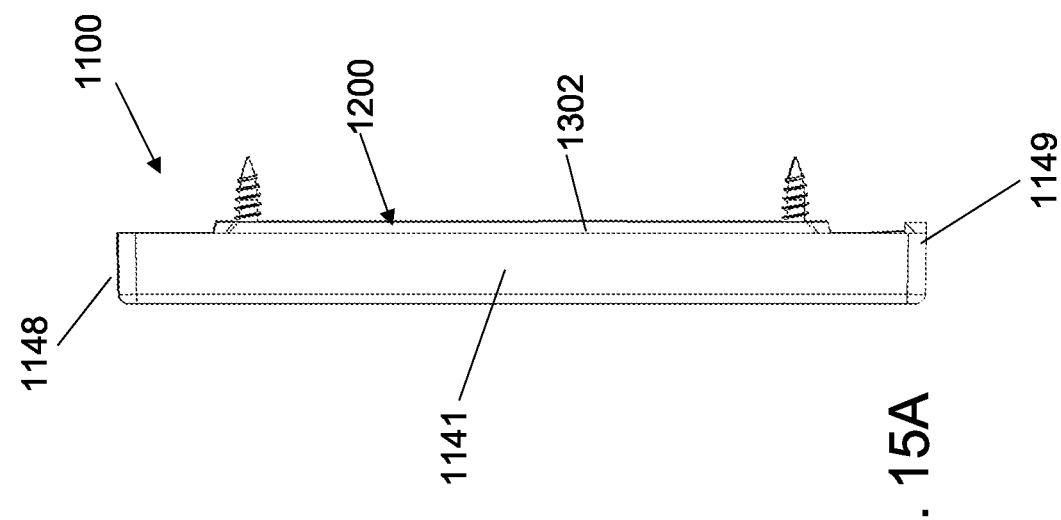

FIGS. 15A-15B are, respectively, example right side and left side views of the example license plate holder 1100 of FIGS. 8-14B in an assembled state, showing alternate views of components of the example frame 1140 and the example base 1200.

Figure 16:
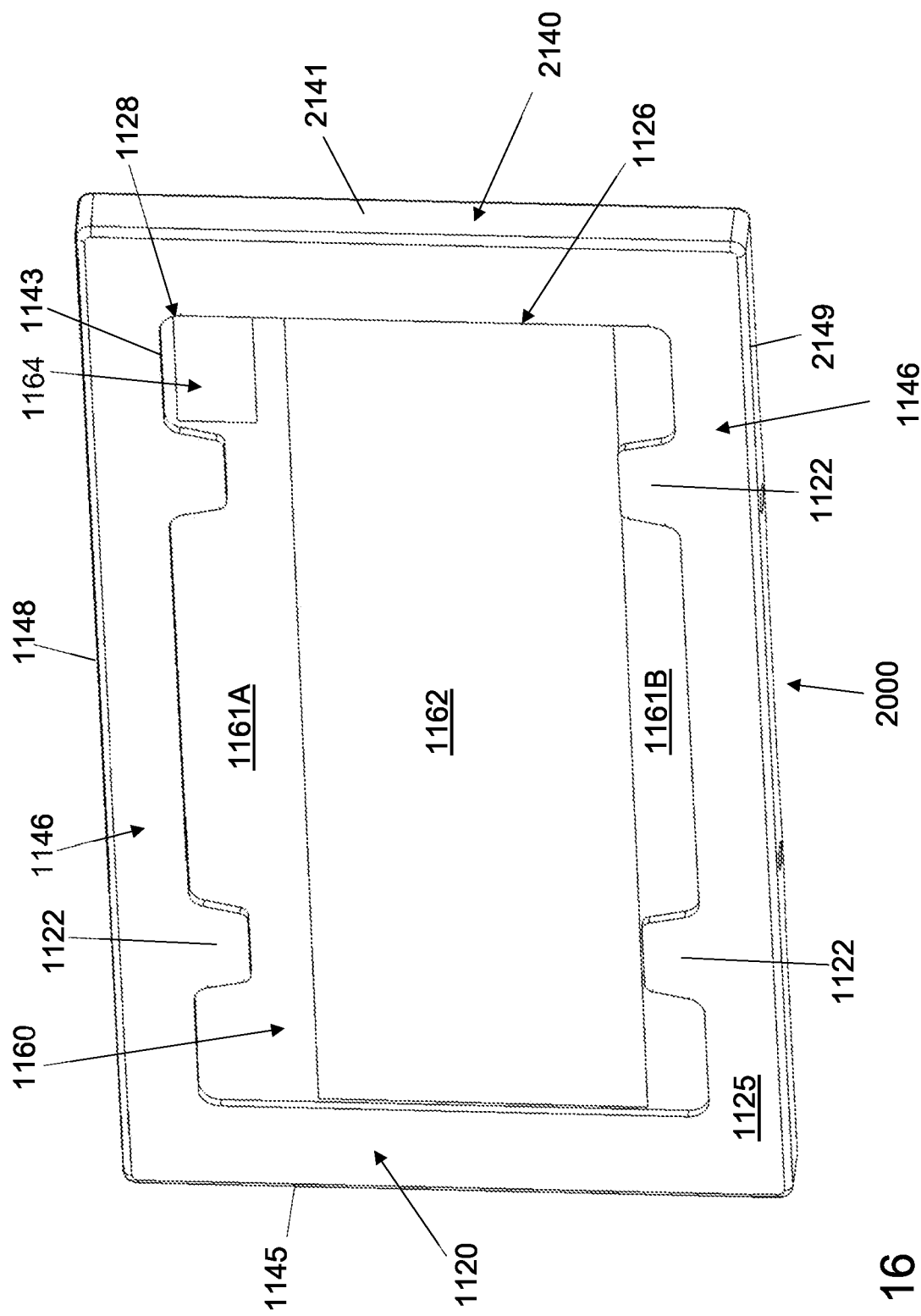
FIG. 16 is an example front perspective view of an example third embodiment of an example license plate holder in an assembled state in accord with at least some of the present concepts.

FIG. 16 is an example front perspective view of an example third embodiment of an example license plate holder 2000 in an assembled state in accord with at least some of the present concepts. FIG. 16 shows an example alignment of the example license plate transmissive substrate 1120 relative the example frame 2140. In the example of FIG. 16, the example license plate transmissive substrate 1120 is adhered to the example frame 2140 via an optically clear adhesive. In accord with other examples, the example license plate transmissive substrate 1120 is connected to the example frame 2140 via one or more mechanical connection members, such as via example front connectors 1147. FIG. 16 also shows an example alignment of the example transmissive substrate 1120 relative to the example first license plate display region 1162, the example second license plate display region 1164, the example third license plate display region 1161A, and the example fourth license plate display region 1161B, such regions being viewable through the example first region 1126 (e.g., central region) and the example third region 1128 of the example transmissive substrate 1120 and through a corresponding opening of the example frame 2140.

Similar to the preceding example of FIGS. 8-15B, the example third embodiment of an example license plate holder 2000 of FIGS. 16-19 also positions the example frame 2140 laterally off-center relative to the example base 2200 during assembly so that example first rear connectors 2500 on the example base 2200 (see, e.g., FIG. 17) are positioned to move laterally relative to example second rear connectors 2600 on the example frame 2140 (see, e.g., FIG. 18) from an initial mounting position to a final assembled position during assembly and the example first rear connectors 2500 and the example second rear connectors 2600 are positioned for securement relative to one another in a final, assembled position (e.g., centered) of the example frame 2140 relative to the example base 2200. In some examples, the example first rear connectors 2500 abut against and frictionally engage the example second rear connectors 2600 in the final, assembled position to restrict relative motion therebetween. In some examples, the example first rear connectors 2500 interlock with the example second rear connectors 2600 in the final, assembled position, and optionally include one or more latching elements. In some examples, one or more of the example first rear connectors 2500 include one of a male or female connection member and one or more of the example second rear connectors 2600 include another one of a male or female connection member so that the example first rear connectors 2500 lock into the example second rear connectors 2600 in the final, assembled position.

Figure 17A:
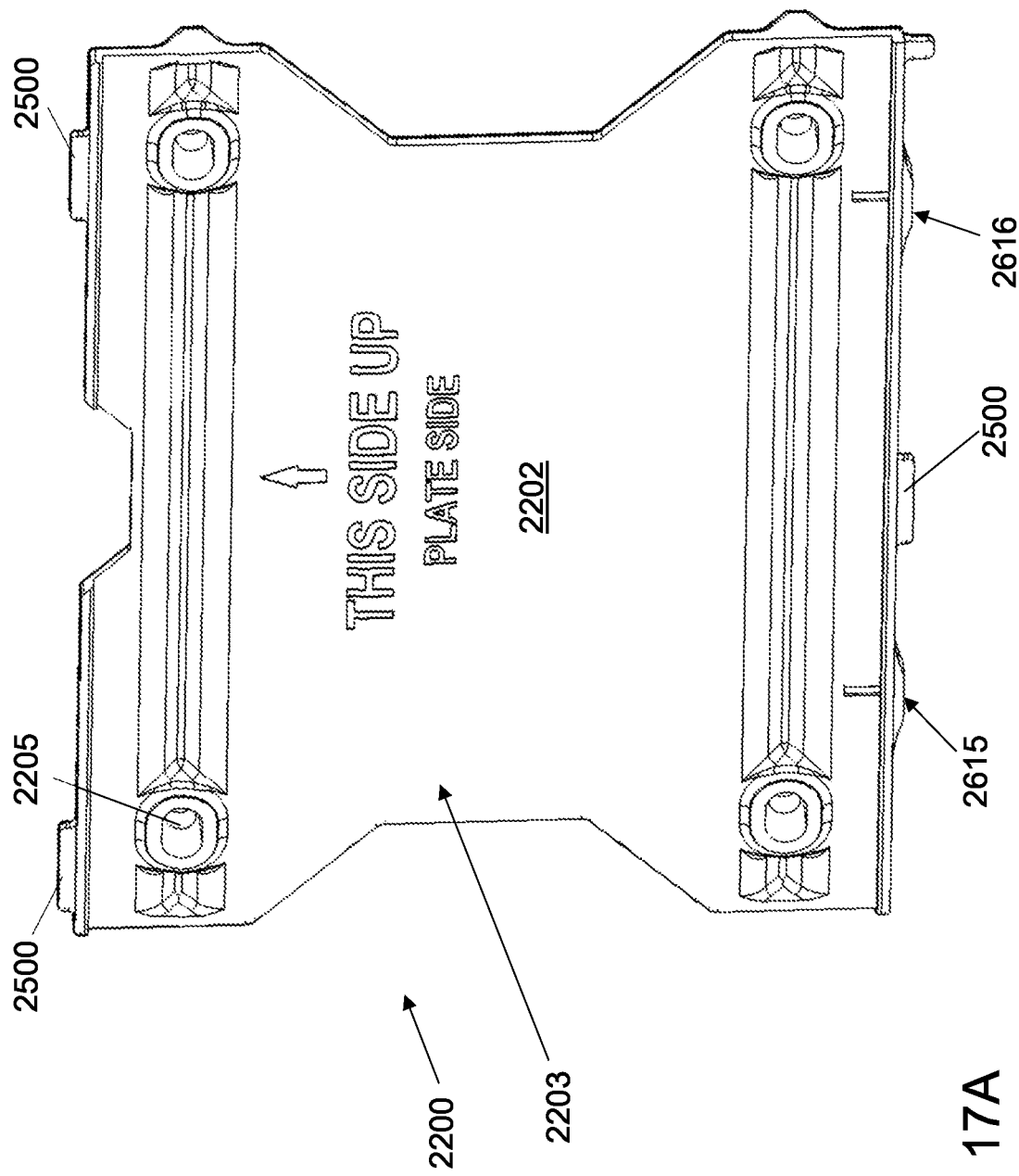
FIG. 17A is an example front perspective view of an example base usable in the example license plate holder of FIG. 16.
Figure 17B:
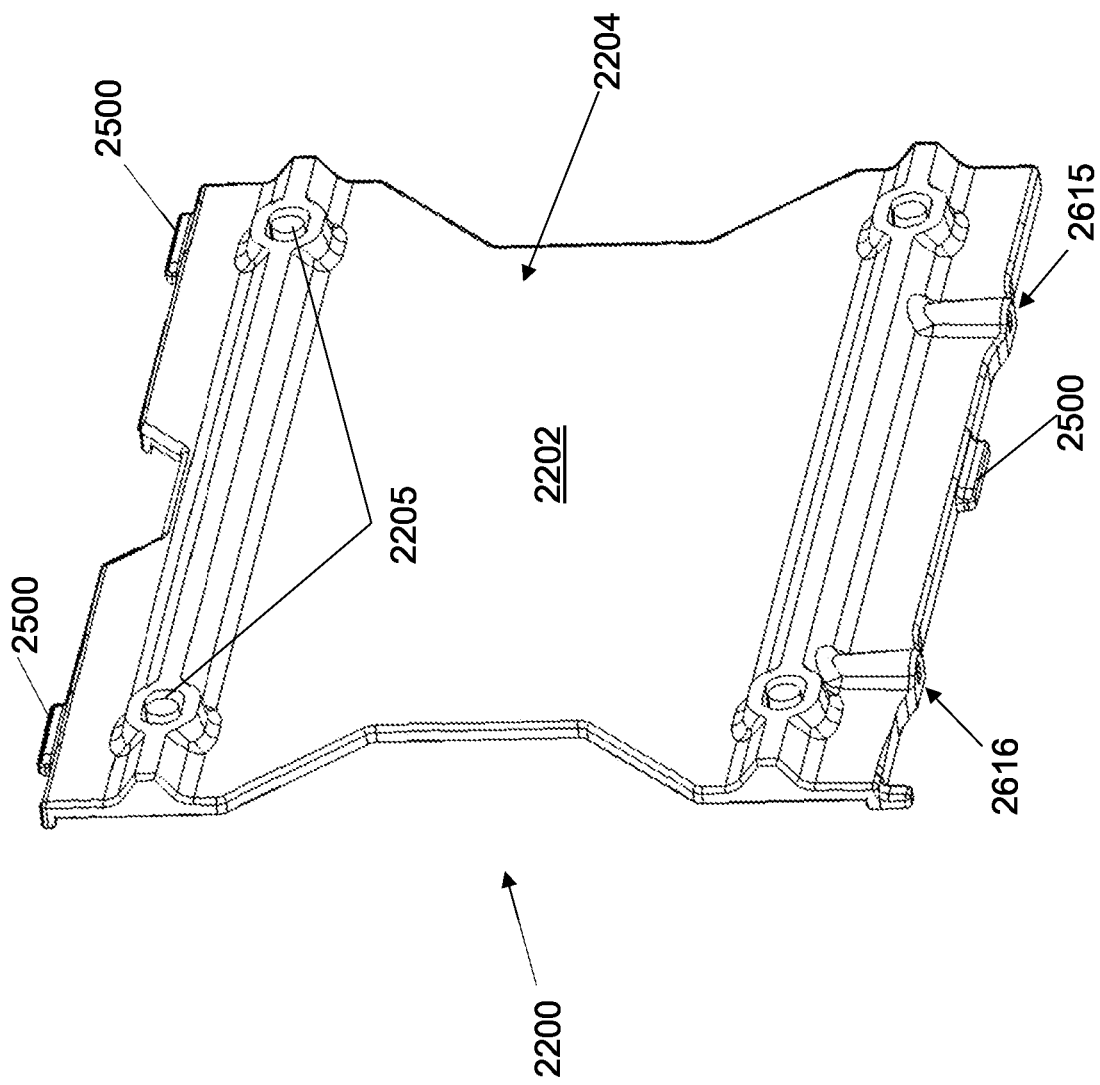
FIG. 17B is an example rear perspective view of the example base of FIG. 17A.

The example first rear connectors 2500 in FIGS. 17A-17B are shown to be substantially planar, omitting the example second portion 1504 of the example first rear connectors 1500. In some examples, one or more of the example first rear connectors 2500 are not as illustrated, but are rather a conventional male or female connection member and one or more of the example second rear connectors 2600 are not as illustrated, but are another one of a male or female connection member so that such first rear connector locks into the second rear connector 2600 in the final, assembled position. The example first rear connectors 2500 and the example second rear connectors 2600 may comprise any complementary shape adapted for engagement such as, but not limited to, complementary right prisms (e.g., wedge) leading to a plateau (e.g., a rectangular shape or square shape having a height equal to that of a base of the right prism), or a rack and pinion arrangement, to name but two examples.

While a certain number of and arrangement of example first rear connectors 2500 and example second rear connectors 2600 are shown in the example license plate holder 2100 of FIGS. 16-19, the present concepts include other numbers of and/or arrangement of the example first rear connectors 2500 and example second rear connectors 2600. For instance, the present concepts include one, two, three or more sets of a first rear connector 2500 and a second rear connector 2600. The one, two, three or more sets of the first rear connector 2500 and the second rear connector 2600 may be arranged asymmetrically (e.g., a different number of and/or position sets of one or more first rear connectors and one or more second rear connectors as between a top and bottom of the example license plate holder, etc.) or on different surfaces of the example base 2200 and example frame 2140.

In some examples, the example first rear connectors 2500 and the example second rear connectors 2600 are positioned on vertical or lateral surfaces of the example frame 2140 and the example base 2200 (e.g., left surfaces and right surfaces in the orientation shown) to facilitate mounting of the frame 2140 to the base 2200 by positioning the frame 2140 vertically off-center relative to the base 2200 during assembly and moving the frame 2140 relative to the base 2200 to center the frame 2140 relative to the base 2200 in the final assembled position. In this configuration, during assembly, the second rear connectors 2600 on the frame 2140 move vertically relative to the first rear connectors 2500 on the base 2200 as the frame 2140 is moved from the initial mounting position to a final assembled position. In the final assembled position, the first rear connectors 2500 and the second rear connectors 2600 engage one another.

Further, while the example third embodiment of the example license plate holder 2000 shown in FIGS. 16-19 shows the example frame 2140 and the example base 2200 being connected at the bottom via two mechanical fasteners (e.g., screws) disposed through the example openings 2112 (see, e.g., FIG. 18), other variants of the design of FIGS. 16-19 optionally reduce the number of mechanical fasteners (e.g., only one screw, only one pin, etc.) or omit the use of mechanical fasteners in favor of complementary mechanical connectors (e.g., clasps, snap-fit connectors, male/female connectors, etc.) formed in the example frame 2140 and the example base 2200.

Similar to the example of FIGS. 8-15B, for example, the example transmissive substrate 1120 may include, for instance, but is not limited to, a substrate of glass, treated or strengthened glass (e.g., Gorilla Glass (Corning), Dragontrail (AGC Inc.), Xensation (Schott AG)), Plexiglass (e.g., Lucite, Acrylite, Perspex, Oroglass Optix, Altuglass, etc.), polycarbonate, acrylic (e.g., injection molded acrylic or polymethyl methacrylate, polystyrene or PMMA. In some examples, the example transmissive substrate 1120 is a uniform substrate of a selected material. In some examples, the example transmissive substrate 1120 defines a plurality of different regions, such as an example first region 1126 (e.g., a central region) having a first set of characteristics (e.g., optical properties, mechanical properties, etc.) and an example second region 1125 (e.g., a peripheral region) having a second set of characteristics. In some examples, two or more regions may have the same characteristics (e.g., the example first region 1126 and the example second region 1125 both being having the same optical properties).

In the example of FIGS. 16-19, the example transmissive substrate 1120 comprises a substrate of glass that is about 0.12 inches thick. In other examples, the example transmissive substrate 1120 comprises a substrate of glass that is less than 0.12 inches thick or greater than 0.12 inches thick, such as between 0.12-0.25 inches thick.

The example frame 2140 of FIG. 16 defines an example central opening (not numbered) corresponding in shape and size to the example first region 1126 of the example transmissive substrate 1120. The example central opening of the example frame 2140 permits display of indicia, such as the license plate number, on an example first license plate display region 1162. In the example of FIG. 16, the example central opening of the example frame 2140 (and the corresponding example first region 1126 of the example transmissive substrate 1120) further reveal the example second license plate display region 1164, the example third license plate display region 1161A, and the example fourth license plate display region 1161B. As with prior examples, the example central opening of the example frame 2140 and the example first region 1126 of the example transmissive substrate 1120 may alternatively be sized differently (e.g., larger, smaller, etc.) to comport with sizing and/or location requirements of any particular jurisdiction and/or to selectively reveal or obscure, for instance, the example third license plate display region 1161A and/or the example fourth license plate display region 1161B.

In the example of FIGS. 16-19, the example transmissive substrate 1120 defines a plurality of example salients 1122 extending inwardly toward the example first region 1126. In some examples, these example salients 1122 are sized and spaced so as to partially or fully visually obscure one or more of (e.g., some of or all of) the example mechanical fasteners 1150 used to secure the example license plate 1160 to the example base 2200 and/or vehicle.

In some examples, the example frame 2140 further defines one or more example frame display regions 1146 adjacent the example central opening. The one or more example frame display regions 1146 include text and/or graphics. In some examples, one or more of the example frame display region(s) 1146 include(s) user-selectable text or graphics (e.g., selected from a list of options provided on a website, custom printed, etc.), such as may be associated with sports team logos, organizations, colleges or universities, companies, phrases, causes, locations, hobbies, etc. In some examples, the example transmissive substrate 1120, rather than the example frame 2140, defines one or more example frame display regions 1146 (e.g., top, bottom, left and/or right, in any combination) adjacent the example central region (i.e., adjacent the example first region 1126). The one or more example frame display regions 1146 include text and/or graphics. In some examples, one or more of the example frame display region(s) 1146 include(s) user-selectable text or graphics (e.g., selected from a list of options provided on a website or portal, custom printed, etc.), such as may be associated with sports teams, organizations, colleges or universities, companies, phrases, causes, charities, causes, etc. In another example, the one or more example frame display regions 146, 1146 are omitted and, instead, one or more example transmissive substrate 1120 display regions (not shown) are provided with text and/or graphics (e.g., printed on a front side and/or a back side of the transmissive substrate 1120, an appliqué on a front side and/or a back side of the transmissive substrate 1120, etc.). In some examples, such text and/or graphics provided on one or more regions of the example transmissive substrate 1120 includes user-selectable text or graphics.

Figure 18:
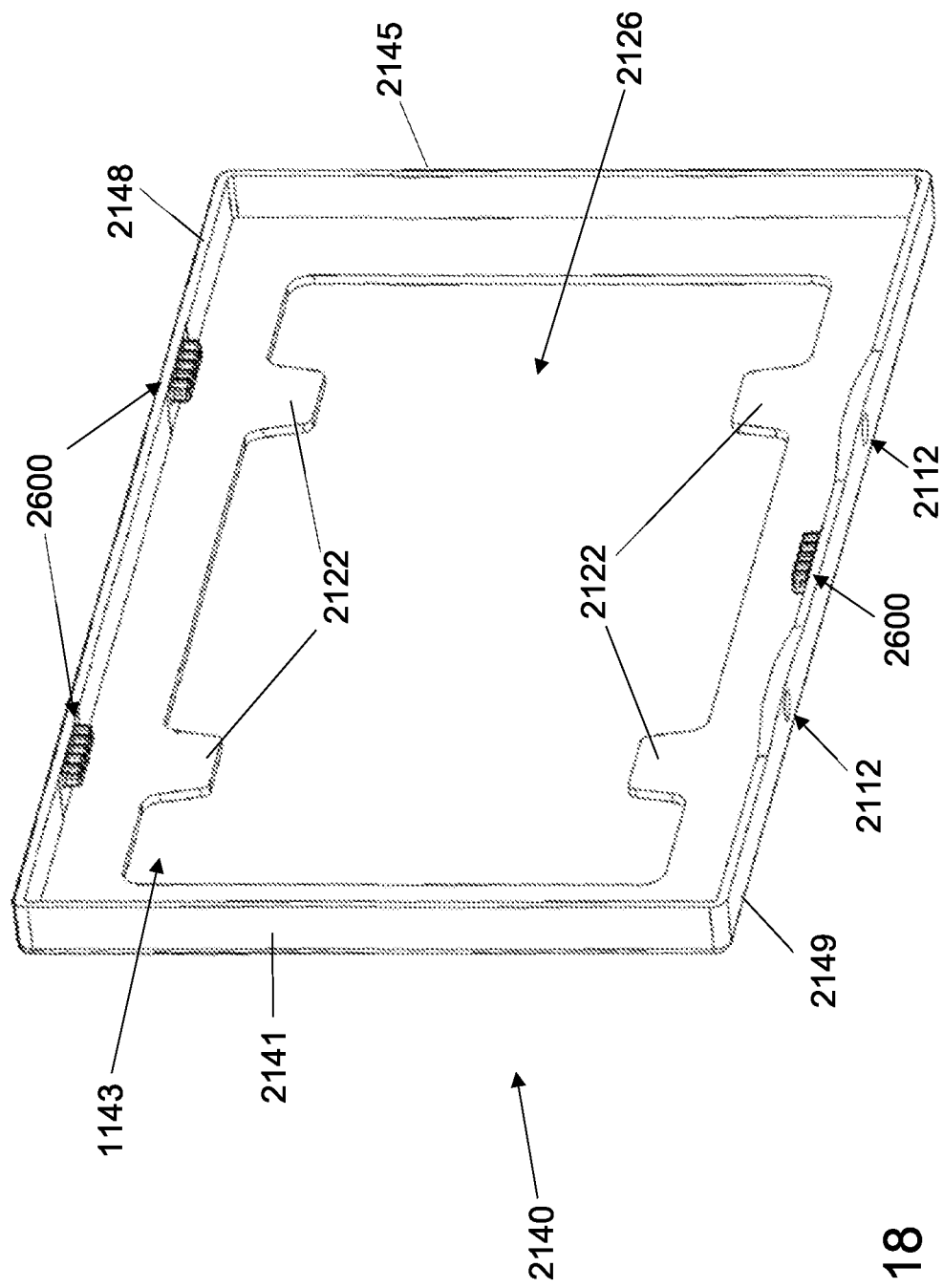
FIG. 18 is a rear perspective view of an example frame for the example license plate holder of FIGS. 16-17C.

The example frame 2140 of FIG. 16 and FIG. 18 defines a plurality of contiguous walls including an example first wall 2141, an example second wall 2145 (see FIGS. 18-19), an example third wall 2148 (see FIG. 18) and an example fourth wall 2149. The example walls extend rearwardly to define a volume (not numbered) at a rear of the example frame 2140 to receive the example license plate 1160 and at least a portion of the example base 2200. In some examples, the example walls also extend forwardly to define a volume (not numbered) at the front of the example frame 2140 to receive the example transmissive substrate 1120. While a plurality of example walls are shown in the example frame 2140 of FIGS. 16 and 18-19, a lesser number of walls could be provided and/or the configuration of the walls altered. For instance, while not a presently preferred example, the frame 2140 could include a subset of the walls of FIGS. 16 and 18-19, such as only wall 2149 or only wall 2148. In such example, the example frame 2140 can connect to the example base 2200 via the subset of the walls (e.g., only wall 2149, only wall 2148, etc.) via one of more sets of mechanical connectors and/or mechanical fasteners.

Figure 17C:
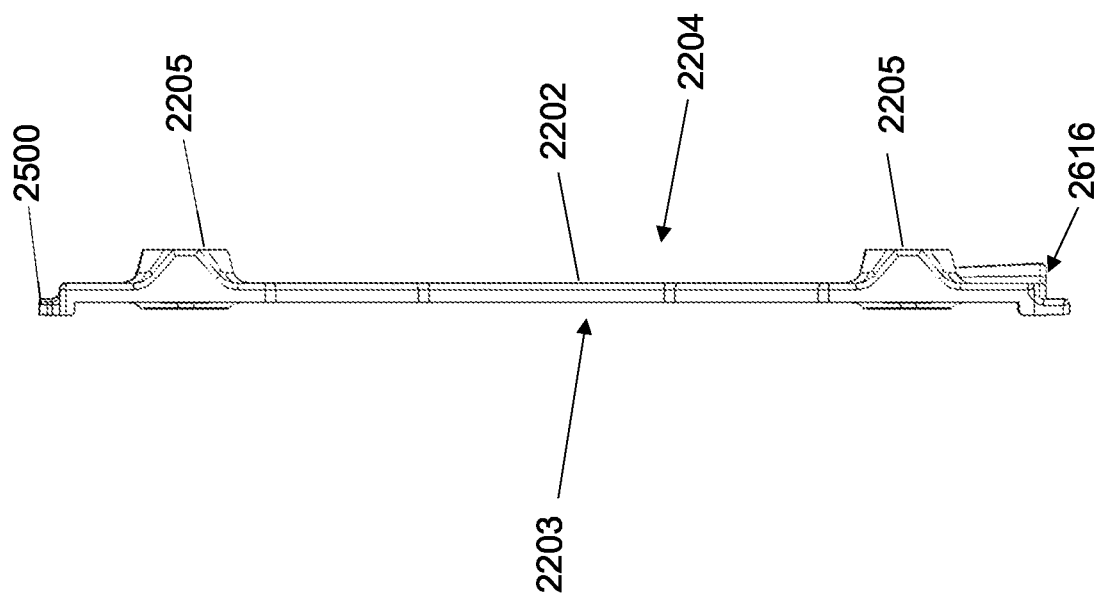
FIG. 17C is an example side view of the example base of FIGS. 17A-17B.

FIGS. 17A-17C are, respectively, an example front perspective view of an example base 2200 usable in the example license plate holder 2000 of FIG. 16, an example rear perspective view of the example base of FIG. 17A, and an example side view of the example base of FIGS. 17A-17B.

The example base 2200 is shown to include example first rear connectors 2500 at an example upper end and at an example lower end. These example first rear connectors 2500 are configured and positioned on the example base 2200 to matingly engage (e.g., interlocking, frictional engagement, abutting, etc.) example second rear connectors 2600 on the example frame 2140. In some examples, the example first rear connectors 2500 and the example second rear connectors 2600 are configured to cooperatively resist lateral translation and rotation of the example frame 2140 relative to the example base 2200 in an assembled state. FIGS. 17A-17C show an example first boss 2615 and an example second boss 2616, each of the example first boss 2615 and the example second boss 2616 being configured to receive a mechanical fastener (e.g., screws, etc.) to secure the example frame 2140 to the example base 2200. In some examples, only one example boss is provided (e.g., centrally positioned) and only one mechanical fastener is used to secure the example frame 2140 to the example base 2200. In some examples the example mechanical fastener(s) are optionally omitted in favor of a more positive lockup between one or more of the example first rear connectors 2500 and a corresponding one or more of the example second rear connectors 2600 (e.g., a locking male/female connector, etc.). In other examples, the example mechanical fastener 1210 could comprise a pin or dowel disposed through the example frame 2140 and into the example base 2200 to prevent relative motion of the example frame 2140 relative to the example base and/or the example license plate 1160, such as a pin inserted through an upper portion of the example frame 2140 and into the example base, such pin being retained in place by gravity and/or an adhesive.

FIG. 17A shows an example front 2203 of the example base 2200 and further shows an example central section 2202 including one or more example first rear connectors 2500 (three as shown) at peripheral portions of the central section 2202, and one or more example first connectors 2205 (e.g., through holes, bosses, male connectors, female connectors, etc.) within the central section 2202 for attaching the example base 2200 to a vehicle. The example central section 2202 optionally defines a recessed volume within which the example license plate 1160 may be received or a raised volume against which the example license plate 1160 may be secured. In some examples, the example central section 2202 is substantially planar.

FIGS. 17B-17C shows different example perspectives of the example base 2200, showing the example front 2203 and the example rear 2204 of the example central section 2202, the one or more example first connectors 2205, and the example first rear connectors 2500.

FIG. 18 is a rear perspective view of an example frame 2140 for the example license plate holder 2000 of FIGS. 16-17C. At an example upper end and at an example lower end of the example frame 2140 are provided example second rear connectors 2600 configured and positioned to engage corresponding example first rear connectors 2500 on the example base 2200 to resist lateral translation and rotation of the example frame 2140 relative to the example base 2200. At an example lower end of the example frame 2140 are provided openings 2112 to receive an example mechanical fastener.

In the example of FIGS. 16-19, the example frame 2140 defines a plurality of example salients 2122 extending inwardly toward the example opening 2126. In some examples, these example salients 2122 are sized and spaced so as to partially or fully visually obscure one or more of (e.g., some of or all of) the example mechanical fasteners 1150 used to secure the example license plate 1160 to the example base 2200 and/or vehicle.

Figure 19:
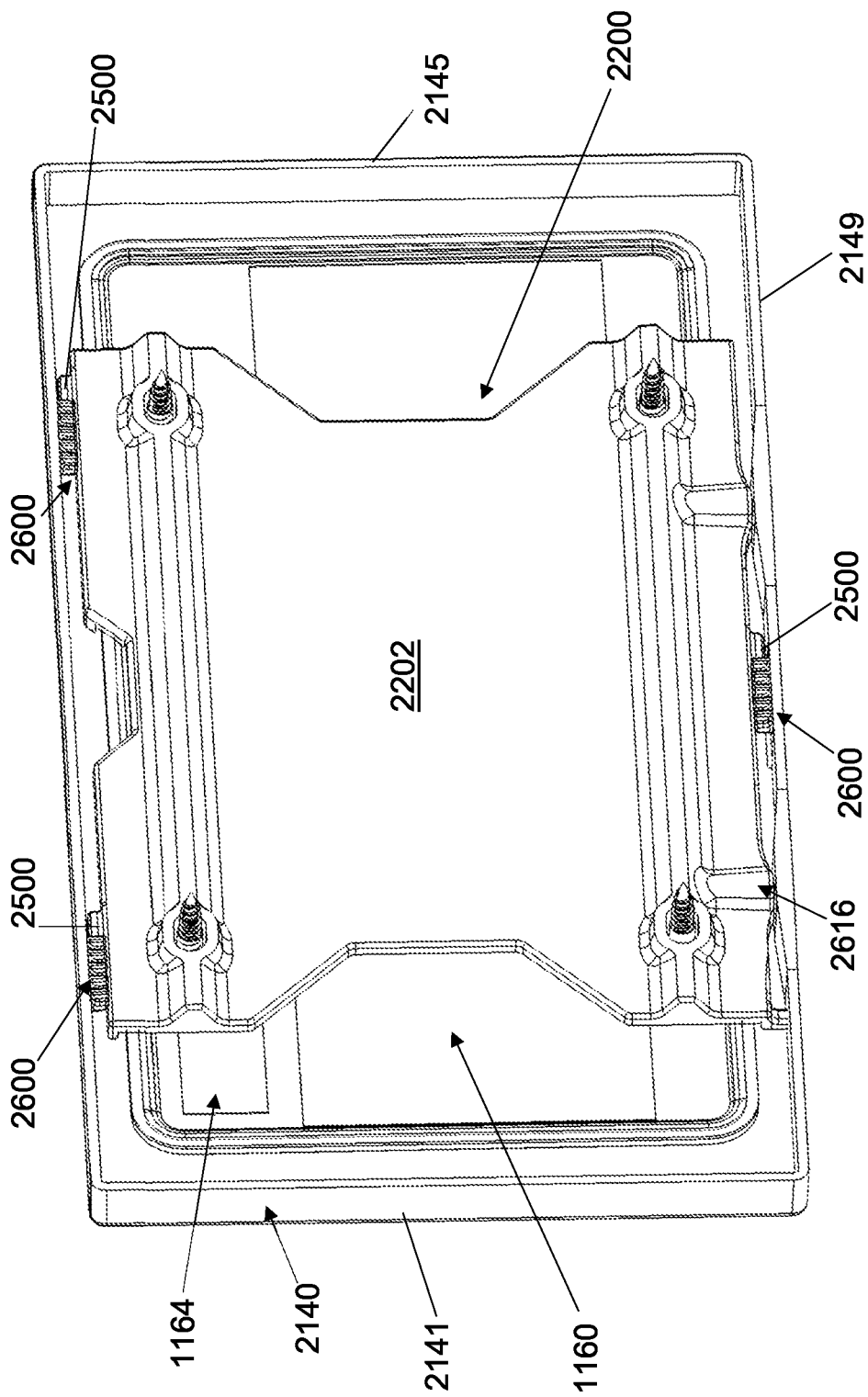
FIG. 19 is a rear perspective view of the example license plate holder of FIGS. 16-18 in an assembled state.

FIG. 19 is a rear perspective view of the example license plate holder 2000 of FIGS. 16-18 in an assembled state. In the view of FIG. 19, the example mechanical fasteners 1210 (e.g., screws, etc.) shown in FIGS. 9A and 11 are not shown, but are disposed through the example openings 2112 in the example frame 2140 and within the example first boss 2616 and the example second boss (not numbered in FIG. 19) formed in the example base 2200 to secure the example frame 2140 to the example base 2200. In some examples, only one example mechanical fastener is used to secure the example frame 2140 to the example base 2200. In some examples the example mechanical fastener(s) 1210 are optionally omitted in favor of a more positive lockup between one or more of the example first rear connectors 2500 and a corresponding one or more of the example second rear connectors 2600 (e.g., a locking male/female connector, etc.). In other examples, the example mechanical fastener 1210 could comprise a pin or dowel disposed to prevent relative motion of the example frame 2140 relative to the example base and/or the example license plate 2160, such as a pin inserted through an upper portion of the example frame 2140 and into the example base, such pin being retained in place by gravity and/or an adhesive (e.g., Loctite, etc.).

In any of the preceding examples and variants thereof, the license plate holder may further include an electrical connector to electrically connect to a license plate lighting circuit of a vehicle and at least one lighting element to illuminate the central opening (1142, 2126) and the at least one display region (e.g., the frame display region 1146, the transmissive substrate display region 1146, etc.).

Although certain example apparatus, articles of manufacture and methods have been disclosed herein, the scope of coverage of this patent is not limited thereto. To the contrary, this patent covers all methods, apparatus and articles of manufacture fairly falling within the scope of the claims of this patent. For example, in one instantiation of the present concepts, the transmissive substrate is formed as a unitary piece to combine the structural elements of the aforementioned example frames (e.g., 140, 1140, etc.) to avoid the need for a separate frame, with the transmissive substrate being connected directly to the license plate (e.g., 160, 1160, etc.) and/or the base (e.g., 200, 1200, etc.).

What is claimed is:

1. A license plate holder, comprising:
a base including a first connector for attaching the base to a vehicle;
a transmissive substrate; and
a frame defining a central opening to permit display of indicia on at least one license plate display region of a license plate disposed between the base and the frame, the frame including at least one first rear connector disposed at a rear or peripheral portion of the frame to removably engage a corresponding at least one second rear connector disposed on the base,
wherein the transmissive substrate and/or the frame further define at least one display region adjacent the central opening of the frame and outside of the at least one license plate display region, and
wherein the transmissive substrate is attached to, or is removably attachable to, a front of the frame to at least substantially cover the front of the frame.

2. The license plate holder of claim 1, wherein the frame is translatable relative to the base from a first position to a second position, wherein in the first position the at least one first rear connector does not engage, or only partially engages, the at least one second rear connector and wherein in the second position the at least one first rear connector engages the at least one second rear connector to secure the frame relative to the base.

3. The license plate holder of claim 1, wherein the at least one first rear connector of the frame comprises a plurality of first rear connectors and wherein the at least one second rear connector of the base comprises a plurality of second rear connectors.

4. The license plate holder of claim 3, wherein at least one of the plurality of second rear connectors is disposed at an upper portion of the base and wherein at least one of the plurality of first rear connectors is disposed at an upper portion of the frame.

5. The license plate holder of claim 3, wherein at least one of the plurality of second rear connectors is disposed at an upper portion of the base, wherein at least one of the plurality of first rear connectors is disposed at an upper portion of the frame, wherein at least one of the plurality of second rear connectors is disposed at a lower portion of the base, and wherein at least one of the plurality of first rear connectors is disposed at a lower portion of the frame.

6. The license plate holder of claim 3, wherein two or more of the plurality of second rear connectors are disposed at an upper portion of the base, wherein two or more of the plurality of first rear connectors are disposed at an upper portion of the frame, wherein at least one of the plurality of second rear connectors is disposed at a lower portion of the base, and wherein at least one of the plurality of first rear connectors is disposed at a lower portion of the frame.

7. The license plate holder of claim 3, wherein at least one second rear connector of the plurality of second rear connectors is disposed at an upper portion of the base, wherein at least one first rear connector of the plurality of first rear connectors is disposed at an upper portion of the frame, wherein two or more of the plurality of second rear connectors are disposed at a lower portion of the base, and wherein two or more of the plurality of first rear connectors are disposed at a lower portion of the frame.

8. The license plate holder of claim 1, wherein the at least one display region defined by the frame comprises at least one display region adjacent the central opening of the frame and wherein the transmissive substrate is disposed at the front of the frame to at least substantially cover the at least one display region defined on the frame.

9. The license plate holder of claim 8, wherein the at least one display region includes at least one of text, graphics, user-selectable text or user-selectable graphics.

10. The license plate holder of claim 1, wherein the transmissive substrate comprises a central region and a peripheral region, and wherein the peripheral region is configured to at least substantially cover the at least one display region.

11. The license plate holder of claim 10, wherein the at least one display region includes at least one of text, graphics, user-selectable text or user-selectable graphics.

12. The license plate holder of claim 1,
wherein the frame defines a plurality of contiguous walls including a first wall, a second wall, a third wall, and a fourth wall,
wherein each of the plurality of contiguous walls extends forwardly to define a first volume at the front of the frame,
wherein each of the plurality of contiguous walls extends rearwardly to define a second volume at the rear of the frame,
wherein the transmissive substrate is received at least partially within the first volume; and
wherein the base is received at least partially within the second volume.

13. The license plate holder of claim 1, wherein the at least one display region includes a plurality of display regions.

* * * * *